(12) United States Patent
Shirouzu

(10) Patent No.: US 11,056,260 B2
(45) Date of Patent: Jul. 6, 2021

(54) REACTOR INCLUDING IRON CORES AND RECTIFIER, LC FILTER, AND MOTOR DRIVE APPARATUS INCLUDING THE SAME

(71) Applicant: Fanuc Corporation, Yamanashi (JP)

(72) Inventor: Masatomo Shirouzu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/747,588

(22) Filed: Jan. 21, 2020

(65) Prior Publication Data

US 2020/0161036 A1 May 21, 2020

Related U.S. Application Data

(62) Division of application No. 15/843,269, filed on Dec. 15, 2017, now Pat. No. 10,593,455.

(30) Foreign Application Priority Data

Dec. 22, 2016 (JP) .............................. JP2016-249198

(51) Int. Cl.
| | |
|---|---|
| *H01F 30/12* | (2006.01) |
| *H01F 3/14* | (2006.01) |
| *H01F 38/00* | (2006.01) |
| *H02K 11/02* | (2016.01) |
| *H01F 37/00* | (2006.01) |

(52) U.S. Cl.
CPC .............. *H01F 3/14* (2013.01); *H01F 37/00* (2013.01); *H01F 38/00* (2013.01); *H02K 11/02* (2013.01)

(58) Field of Classification Search
CPC .................................. H01F 30/12; H01F 3/12

USPC ............................................................. 336/5
See application file for complete search history.

(56) References Cited

U.S. PATENT DOCUMENTS

| | | | |
|---|---|---|---|
| 2,406,704 A * | 8/1946 | Mossay | H01F 30/12 336/5 |
| 6,211,765 B1 | 4/2001 | Ito et al. | |
| 7,626,288 B2 | 12/2009 | Protze | |
| 8,653,931 B2 | 2/2014 | Xu et al. | |
| 10,008,322 B2 * | 6/2018 | Bhide | H01F 27/28 |
| 10,748,703 B2 | 8/2020 | Shirouzu et al. | |
| 2009/0261939 A1 * | 10/2009 | Shudarek | H01F 27/263 336/212 |
| 2012/0106210 A1 * | 5/2012 | Xu | H02P 9/02 363/37 |

(Continued)

FOREIGN PATENT DOCUMENTS

| | | |
|---|---|---|
| CN | 102360726 A | 2/2012 |
| CN | 102360863 A | 2/2012 |

(Continued)

OTHER PUBLICATIONS

Entire patent prosecution history of U.S. Appl. No. 15/843,269, filed Dec. 15, 2017, entitled "Reactor Including Iron Cores and Rectifier, LC Filter, and Motor Drive Apparatus Including the Same."

*Primary Examiner* — Ronald Hinson
(74) *Attorney, Agent, or Firm* — RatnerPrestia

(57) ABSTRACT

A reactor includes a plurality of iron cores and a winding wound on any of the plurality of iron cores; a gap is formed between two iron cores facing against each other; a gap-facing surface of one iron core has an area larger than that of a gap-facing surface of the other iron core.

4 Claims, 32 Drawing Sheets

(56) References Cited

U.S. PATENT DOCUMENTS

| | | |
|---|---|---|
| 2015/0102882 A1 | 4/2015 | Shudarek |
| 2017/0011842 A1 | 1/2017 | Ishigaki et al. |
| 2017/0040099 A1* | 2/2017 | Bhide .................. H01F 27/263 |

FOREIGN PATENT DOCUMENTS

| | | |
|---|---|---|
| CN | 202159545 U | 3/2012 |
| DE | 102017101156 A1 | 8/2017 |
| JP | S52051568 A | 4/1977 |
| JP | 5553404 A | 4/1980 |
| JP | 2008210998 A | 9/2008 |
| JP | 2010027946 A | 2/2010 |
| JP | 2011244672 A | 12/2011 |
| JP | 2015159657 A | 9/2015 |
| JP | 2016096313 A | 5/2016 |

\* cited by examiner

EFFECTIVE AREA P OF GAP

EFFECTIVE AREA P(1−α) OF GAP

REACTOR INCLUDING IRON CORES AND RECTIFIER, LC FILTER, AND MOTOR DRIVE APPARATUS INCLUDING THE SAME

CROSS REFERENCE TO RELATED APPLICATIONS

This application is a divisional application of U.S. patent application Ser. No. 15/843,269, filed Dec. 15, 2017, which claims benefit of Japanese Patent Application No. 2016-249198, filed Dec. 22, 2016, the disclosures of these applications are being incorporated herein by reference in their entirety for all purposes.

BACKGROUND OF THE INVENTION

1. Field of the Invention

The present invention relates to a reactor including iron cores and a rectifier, an LC filter, and a motor drive apparatus including the same.

2. Description of the Related Art

A reactor including iron cores has a winding wound on the iron core, causes magnetic flux to be generated by current flowing through the winding, and temporarily stores most of magnetic energy, which exists as magnetic flux, in a gap provided between the iron cores.

For example, in a motor drive apparatus that drives a motor in a machine tool, a forming machinery, a molding machine, an industrial machinery, or various types of robots, AC power supplied from an AC power supply side is first converted by a rectifier to DC power, and converted further by an inverter to AC power, which is used as a driving power for a motor provided for each drive axis. The scope of application of reactors in industry is wide, which includes such as an AC reactor provided on an AC input side of a rectifier, a smoothing reactor provided on a DC output side of the rectifier, and a reactor constituting an LC filter on an AC output side of an inverter in a motor drive apparatus.

Conventionally, there have been approaches for storing a lot of magnetic energy using a small number of iron cores and windings. Various techniques have been also proposed to reduce eddy-current loss caused by eddy currents generated in a winding by leakage flux near a gap.

For example, as disclosed in Japanese Unexamined Patent Publication (Kokai) No. S55-53404, there is a reactor for storing more magnetic energy, in which an area of a gap provided between iron cores is configured to be larger than a cross-sectional area of the iron core by slanting the gap relative to an axial direction of the reactor to make an acute angle. In addition, as disclosed in Japanese Unexamined Patent Publication (Kokai) No. 2008-210998, for example, there has been proposed a reactor in which a winding is located away from the vicinity of a gap or a winding is not disposed near a gap, in order to reduce eddy-current loss in the winding caused by leakage flux from the gap.

When current flows through the winding wound on the iron cores, magnetic flux flows through the iron cores and the gap between the iron cores of the reactor, thereby forming a so-called magnetic path. When passing a gap, magnetic flux has a characteristic in which it tries to flow into/out from iron cores on both sides of the gap as vertically as possible. Accordingly, with a shape of a gap of a conventional reactor, there has been a problem in which leakage flux is easily radiated near a gap toward a winding. This problem is described as follows using the reactor disclosed in Japanese Unexamined Patent Publication (Kokai) No. S55-53404 as an example.

FIG. 30A is a diagram for explaining leakage flux in the reactor disclosed in Japanese Unexamined Patent Publication (Kokai) No. S55-53404, and a full sectional view schematically illustrating a structure of the reactor. FIG. 30B is a diagram for explaining leakage flux in the reactor disclosed in Japanese Unexamined Patent Publication (Kokai) No. S55-53404, and a partial sectional view schematically illustrating magnetic flux generated in the reactor. As illustrated in FIG. 30A, a reactor 101 disclosed in Japanese Unexamined Patent Publication (Kokai) No. S55-53404 includes a structure in which a recessed iron core 111 and a protruding iron core 112 are provided so as to interpose a gap 120, and windings 113 are wound around the recessed iron core 111 and the protruding iron core 112. The recessed iron core 111 includes a recessed gap-facing surface 121 as a surface facing against the gap 120 while the protruding iron core 112 includes a protruding gap-facing surface 122 as a surface facing against the gap 120. When current flows through the winding 113, magnetic flux is generated. In the illustrated example, a case is illustrated, in which magnetic flux is generated in a direction of dotted arrows. Through the recessed iron core 111 and the protruding iron core 112 of the reactor 101, main flux flows. Most of the magnetic flux flowing perpendicularly out of the protruding gap-facing surface 122 of the protruding iron core 112 flows perpendicularly into the recessed gap-facing surface 121 of the recessed iron core 111 while a portion thereof flows perpendicularly into a side surface (i.e., a surface different from the recessed gap-facing surface 121) of the recessed iron core 111. The magnetic flux flowing perpendicularly into the side surface of the recessed iron core 111 is leakage flux. Thus, the reactor 101 disclosed in Japanese Unexamined Patent Publication (Kokai) No. S55-53404 has a problem in which a lot of leakage flux is generated.

As a result, in a conventional reactor including a structure where a lot of leakage flux is generated, there has been a problem in which the shape of the winding needs to be larger in order to store more magnetic energy as well as to reduce eddy-current loss, and this inevitably causes the reactor to be larger.

SUMMARY OF INVENTION

Therefore, there has been a demand for provision of a reactor that can suppress generation of leakage flux near a gap, store more magnetic energy, and reduce eddy-current loss as well as a rectifier, an LC filter, and a motor drive apparatus including such reactor.

According to one aspect of the present disclosure, a reactor may include a plurality of iron cores and a winding wound on any of the plurality of iron cores; a gap is formed between two iron cores facing against each other; a gap-facing surface of one of the iron cores has an area larger than that of a gap-facing surface of the other iron core.

Herein, the respective iron cores may be configured to be in contact with each other at a region other than the gap-facing surfaces or formed integrally.

Further, the plurality of iron cores may include a first iron core having a first gap-facing surface and a second iron core having a second gap-facing surface as a surface facing against the first gap-facing surface, and the winding may be wound on one of the first iron core and the second iron core or both thereof, and a portion of the first gap-facing surface near an outer edge thereof of the first iron core and an axial direction may form an acute angle on an inner side of the first iron core, and a portion of the second gap-facing surface near an outer edge thereof of the second iron core and an axial direction may form an obtuse angle on an inner side of the second iron core, and the first gap-facing surface may be configured to have a larger area than the second gap-facing surface.

Further, a gap may be formed between the iron cores disposed side by side with each other in a substantially circumferential direction, and each of the iron cores may be provided with a first gap-facing surface, which faces against an iron core disposed side by side with the iron core concerned on one side, and a second gap-facing surface, which faces against an iron core disposed side by side with the iron core concerned on the other side, and, in two of the iron cores disposed side by side with each other, the first gap-facing surface of one of the iron cores may face against the second gap-facing surface of the other iron core, and the first gap-facing surface may be configured to have a larger area than the second gap-facing surface.

Further, the plurality of iron cores may include a plurality of first iron cores each having two first gap-facing surfaces and a plurality of second iron cores each having two second gap-facing surfaces as surfaces facing against the first gap-facing surfaces, and the first iron cores may be disposed side by side with each other in a substantially circumferential direction, and the second iron cores may be disposed side by side with each other in a substantially circumferential direction such that each of the second gap-facing surfaces of the second iron core concerned faces against one of the first gap-facing surfaces of the first iron cores adjacent to the second iron core concerned, and the winding may be wound on the second iron cores, and either the first gap-facing surface or the second gap-facing surface may have an area larger than the other.

Further, the plurality of iron cores may include a plurality of second iron cores each having two second gap-facing surfaces and a first iron core having first gap-facing surfaces, the number of which correspond to the total number of the second gap-facing surfaces of the plurality of second iron cores, and the second iron cores may be disposed side by side with each other in a substantially circumferential direction such that each of the second gap-facing surfaces of the second iron core concerned faces against one of the first gap-facing surfaces of the first iron core, and the winding may be wound on the second iron core, and either the first gap-facing surface or the second gap-facing surface may have an area larger than the other.

Further, the first gap-facing surface may include a recessed shape while the second gap-facing surface may include a protruding shape.

Further, recessed shapes and protruding shapes, the number of which is one less than that of the recessed shapes, may be formed alternately in the first gap-facing surface, and recessed shapes and protruding shapes, the number of which is one greater than that of the recessed shapes, may be formed alternately in the second gap-facing surface.

Further, a bottom portion of the recessed shape may include a curved shape and a top portion of the protruding shape may include a curved shape.

In a rectifier according to one aspect of the present disclosure, the aforementioned reactor may be provided as an AC reactor on an AC input side of the rectifier or a smoothing reactor on a DC output side of the rectifier.

In an LC filter according to one aspect of the present disclosure, the aforementioned reactor may be provided as a reactor constituting the LC filter.

In a motor drive apparatus according to one aspect of the present disclosure, the aforementioned reactor may be provided as at least one of an AC reactor on an AC input side of a rectifier for converting AC power input from an AC power supply to DC power, a smoothing reactor on a DC output side of the rectifier, and a reactor constituting an LC filter on an AC output side of an inverter for converting DC power output from the rectifier to AC power for driving a motor.

BRIEF DESCRIPTION OF THE DRAWINGS

The present invention will be more clearly understood by reference to the following accompanying drawings.

DETAILED DESCRIPTION

Figure 1A:
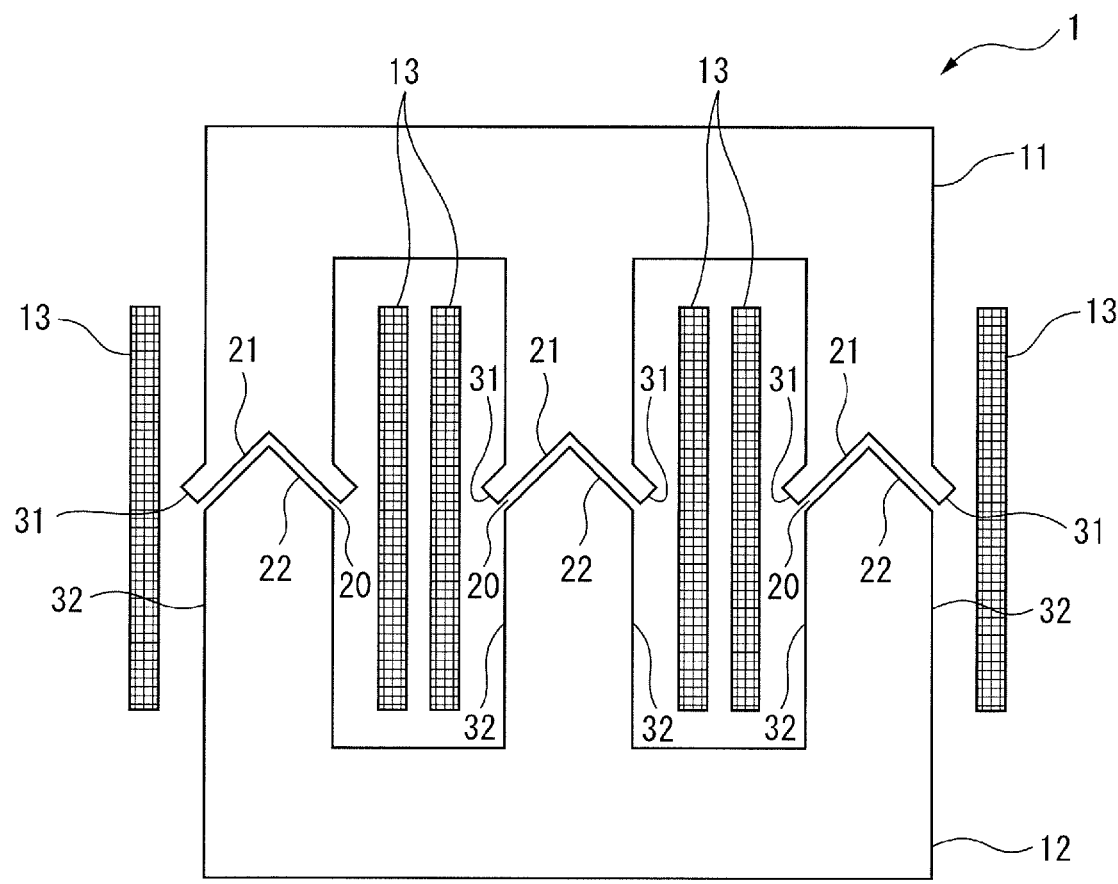
FIG. 1A is a diagram illustrating a reactor according to a first embodiment of the present disclosure, and a full sectional view schematically illustrating a structure of the reactor.

Next, embodiments of the present disclosure will be described with reference to the drawings. To facilitate understanding, scales are changed in the following drawings as appropriate. Embodiments illustrated in the drawings are merely examples for implementing one aspect of the present disclosure, and the present disclosure is not limited to the embodiments.

In the present description, "axial direction" refers to a direction of main flux flowing through an iron core of a reactor. In the present description, when there is a description as "inner one of angles formed between a portion of a surface near an outer edge thereof and an axial direction" with respect to each of a first gap-facing surface and a second gap-facing surface, it means a minor angle of two angles formed by a portion of the surface concerned near an outer edge thereof and an axial direction on the axial center side, not a major angle. In the present description, it may be understood that a minor angle has the same meaning as a so-called interior angle.

A reactor according to one aspect of the present disclosure includes a plurality of iron cores and a winding wound on any of the plurality of iron cores. Between two iron cores facing against each other, a gap is formed, and a gap-facing surface of one of the iron cores has an area larger than that of a gap-facing surface of the other iron core. Hereinafter, specific configurations will be described with respect to first to fifteenth embodiments.

Figure 1B:
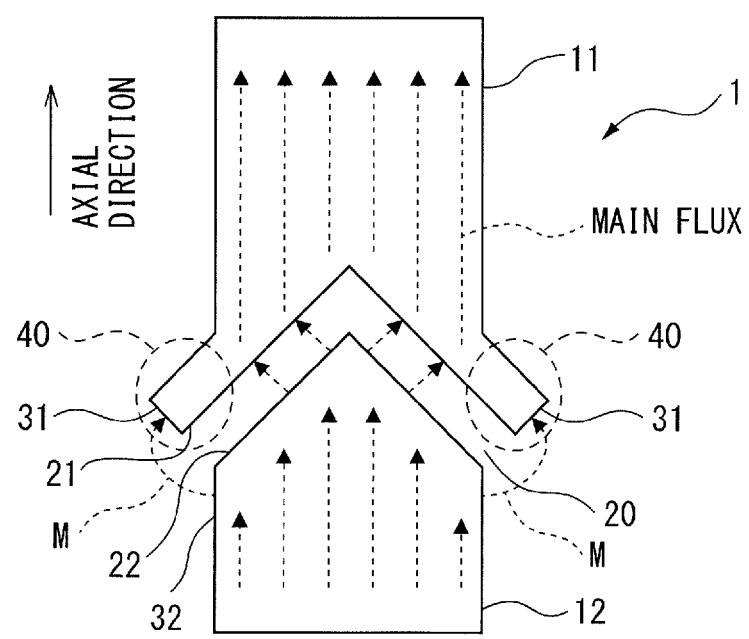
FIG. 1B is a diagram illustrating the reactor according to the first embodiment of the present disclosure, and a partial sectional view schematically illustrating magnetic flux generated in the reactor.
Figure 2:
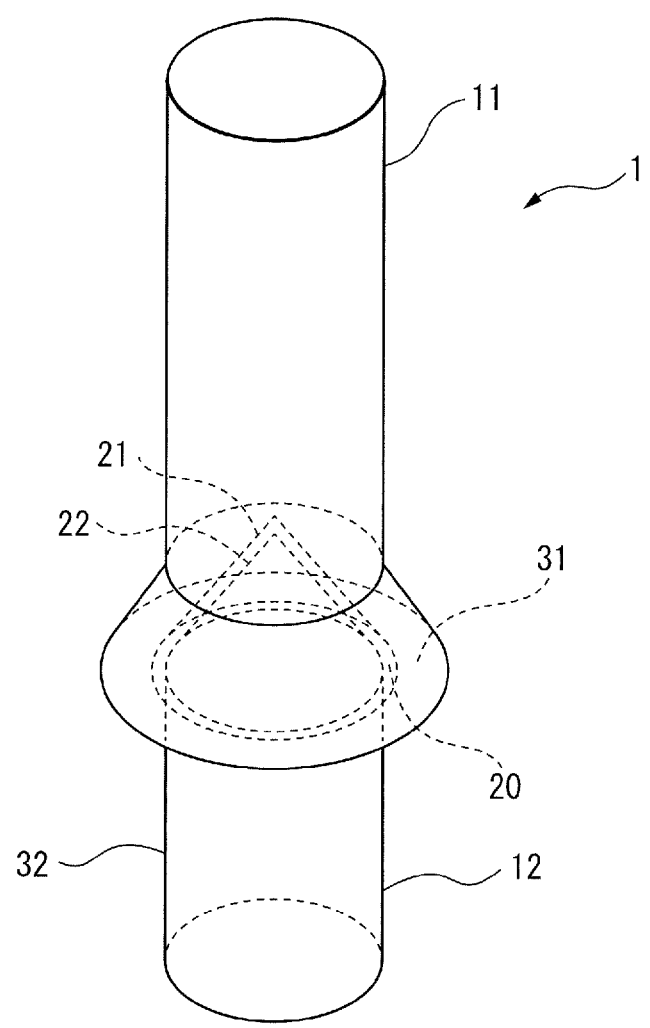
FIG. 2 is a perspective view of the reactor according to the first embodiment of the present disclosure, illustrated in FIG. 1A and FIG. 1B, when a leg portion thereof is a cylindrical reactor.
Figure 3:
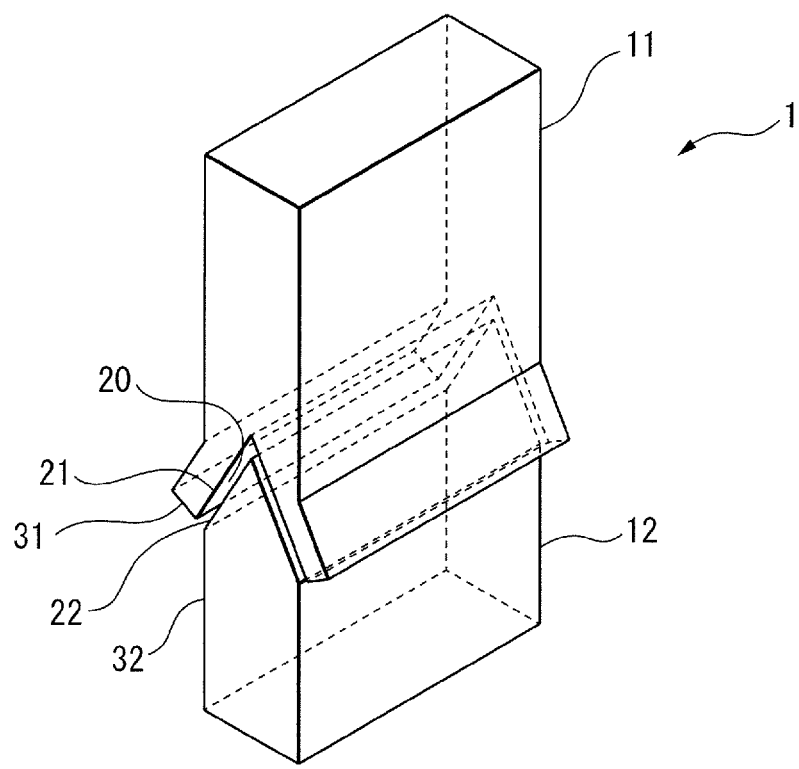
FIG. 3 is a perspective view of the reactor according to the first embodiment of the present disclosure, illustrated in FIG. 1A and FIG. 1B, when a leg portion thereof is a square reactor.

FIG. 1A is a diagram illustrating a reactor according to the first embodiment of the present disclosure, and a full sectional view schematically illustrating a structure of the reactor. FIG. 1B is a diagram illustrating the reactor according to the first embodiment of the present disclosure, and a partial sectional view schematically illustrating magnetic flux generated in the reactor. FIG. 2 is a perspective view of the reactor according to the first embodiment of the present disclosure, illustrated in FIG. 1A and FIG. 1B, when a leg portion thereof is a cylindrical reactor while FIG. 3 is a perspective view of the reactor according to the first embodiment of the present disclosure, illustrated in FIG. 1A and FIG. 1B, when a leg portion thereof is a square reactor.

A reactor 1 according to the first embodiment of the present disclosure includes a first iron core 11, a second iron core 12, and windings 13. Between the first iron core 11 and the second iron core 12, which face against each other, a gap 20 is formed.

The first iron core 11 includes a first gap-facing surface 21 as a surface facing against the gap 20 formed between the first iron core 11 and the second iron core 12. A portion of the first gap-facing surface 21 near an outer edge thereof of the first iron core 11 and an axial direction form an acute angle on the inner side of the first iron core 11. In other words, the inner one of angles formed by a portion of the first gap-facing surface 21 near an outer edge thereof and the axial direction being an acute angle causes the first gap-facing surface 21 to have a structure in which the portion thereof near the outer edge is inclined relative to the axial direction at an acute angle.

The second iron core 12 includes a second gap-facing surface 22 as a surface facing against the first gap-facing surface 21 of the first iron core 11 with the gap 20 interposed therebetween. A portion of the second gap-facing surface 22 near an outer edge thereof of the second iron core 12 and an axial direction form an obtuse angle on the inner side of the second iron core 12. In other words, the inner one of angles formed by a portion of the second gap-facing surface 22 near an outer edge thereof and the axial direction being an obtuse angle causes the second gap-facing surface 22 to have a structure in which the portion thereof near the outer edge is inclined relative to the axial direction at an obtuse angle. In the illustrated example, the first gap-facing surface 21 of the first iron core 11 includes a recessed shape while the second gap-facing surface 22 of the second iron core 12 includes a protruding shape.

Note that the first iron core 11 and the second iron core 12 may be in contact with each other at a region other than the first gap-facing surface 21 and the second gap-facing surface 22 or may be formed integrally.

Figure 16A:
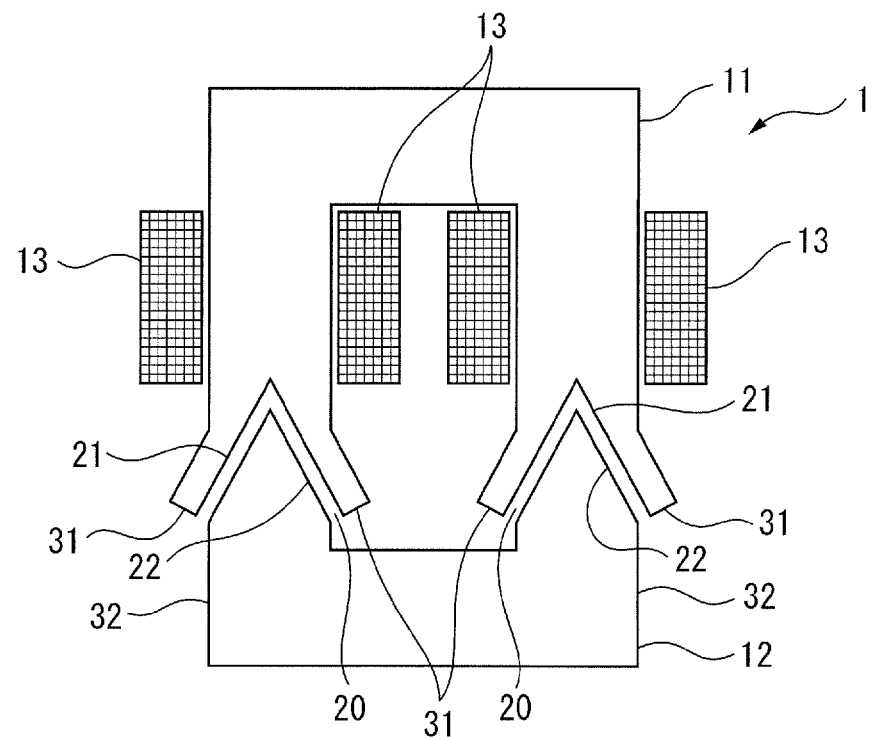
FIG. 16A and FIG. 16B are full sectional views illustrating a reactor according to a ninth embodiment of the present disclosure.
Figure 16B:
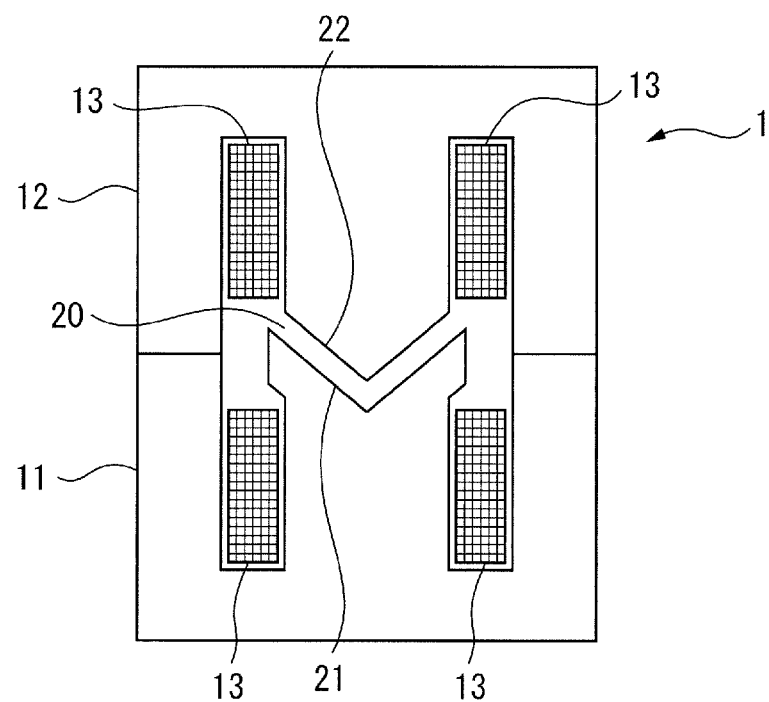

The winding 13 is wound on either the first iron core 11 or the second iron core 12 or both thereof while the winding 13 is wound on the first iron core 11 and the second iron core 12 in the illustrated example. When the winding is wound on both, the winding may be split near a gap as illustrated in FIG. 16B.

In the reactor 1 according to the first embodiment of the present disclosure, the first gap-facing surface 21 of the first iron core 11 is configured to have a larger area than the second gap-facing surface 22 of the second iron core 12. In other words, the first iron core 11 and the second iron core 12 are configured such that an outer peripheral edge formed by a line of intersection of the first gap-facing surface 21 of the first iron core 11 and a surface 31 adjacent to the first gap-facing surface 21 has a length longer than an outer peripheral edge formed by a line of intersection of the second gap-facing surface 22 of the second iron core 12 and a surface 32 adjacent to the second gap-facing surface 22. Thus, as illustrated in FIG. 1A and FIG. 1B, the first iron core 11 is configured to include a projection portion 40 near the gap 20, and the first iron core 11 around the gap has thickness larger than a portion of the first iron core 11 closer to the gap concerned and the second iron core 12. FIG. 1A and FIG. 1B illustrate an example of the aforementioned configuration of the first iron core 11 and the second iron core 12. Variations of the aforementioned configuration of the first iron core 11 and the second iron core 12 will be described hereinafter.

FIG. 1B illustrates magnetic flux generated when current flows through the winding 13 by dotted arrows. When current flows through the winding 13 (not illustrated in FIG. 1B), magnetic flux flows through the first iron core 11 and the second iron core 12 of the reactor 1 and the gap 20 between these iron cores, thereby forming a magnetic path. Since the first iron core 11 and the second iron core 12 have higher magnetic permeability than the gap 20, which is non-magnetic, each of the magnetic flux will separate from each other when passing the gap 20 and thus, the magnetic flux density in the gap 20 becomes lower than that in the iron cores. Furthermore, magnetic flux has a characteristic in which it tries to flow into/out from the first iron core 11 and the second iron core 12 as vertically as possible. Consequently, when main flux flows through the first iron core 11 and the second iron core 12 of the reactor 1, the main flux directed from the second iron core 12 to the first iron core 11 requires a larger area than when flowing through the second iron core 12; therefore, part of the main flux flows out from not only the second gap-facing surface, but also from the side surface 32 of the second iron core 12, and vertically flows into the surface 31 adjacent to the first gap-facing surface 21 of the first iron core 11, a surface adjacent to the surface 31 of the projection portion 40, and the side surface of the first iron core 11. This will be explained in further detail with reference to FIG. 4A and FIG. 4B.

Figure 4A:
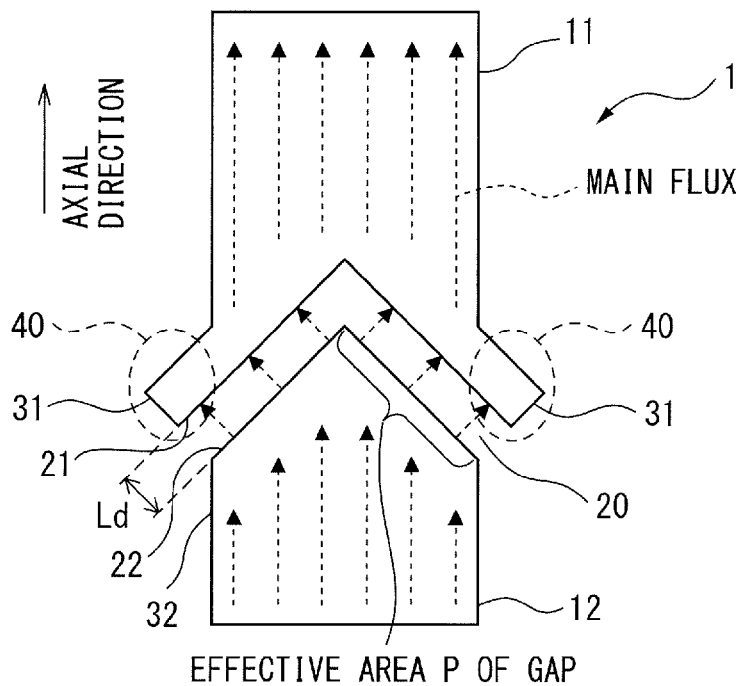
FIG. 4A is a diagram for explaining the reactor according to the first embodiment of the present disclosure, illustrated in FIG. 1A and FIG. 1B, and a reactor disclosed in Japanese Unexamined Patent Publication (Kokai) No. S55-53404 in comparison with each other, and a partial sectional view schematically illustrating magnetic flux generated in the reactor according to the first embodiment of the present disclosure, illustrated in FIG. 1A and FIG. 1B.
Figure 4B:
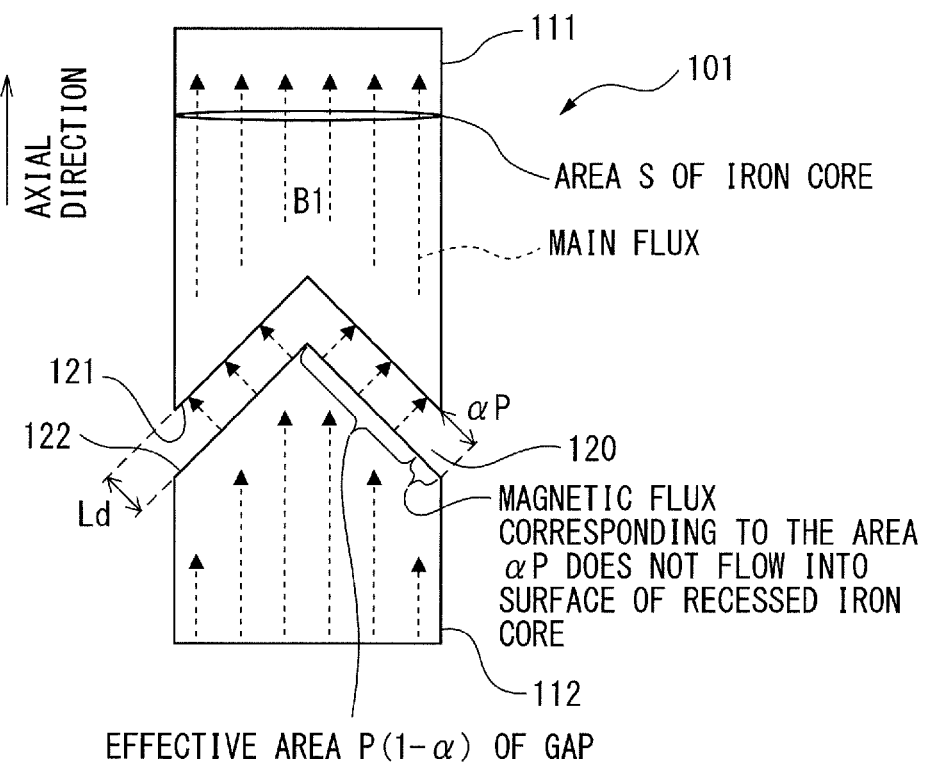
FIG. 4B is a diagram for explaining the reactor according to the first embodiment of the present disclosure, illustrated in FIG. 1A and FIG. 1B, and the reactor disclosed in Japanese Unexamined Patent Publication (Kokai) No. S55-53404 in comparison with each other, and a partial sectional view schematically illustrating magnetic flux generated in the reactor disclosed in Japanese Unexamined Patent Publication (Kokai) No. S55-53404.

FIG. 4A is a diagram for explaining the reactor illustrated in FIG. 1A and FIG. 1B and the reactor disclosed in Japanese Unexamined Patent Publication (Kokai) No. S55-53404 in comparison with each other, and a partial sectional view schematically illustrating magnetic flux generated in the reactor illustrated in FIG. 1A and FIG. 1B. FIG. 4B is a diagram for explaining the reactor illustrated in FIG. 1A and FIG. 1B and the reactor disclosed in Japanese Unexamined Patent Publication (Kokai) No. S55-53404 in comparison with each other, and a partial sectional view schematically illustrating magnetic flux generated in the reactor disclosed in Japanese Unexamined Patent Publication (Kokai) No. S55-53404. In FIG. 4A and FIG. 4B, illustration of the winding 13 is omitted.

In comparing the reactor 1 according to the first embodiment of the present disclosure, illustrated in FIG. 1A and FIG. 1B, with a reactor 101 disclosed in Japanese Unexamined Patent Publication (Kokai) No. S55-53404, the magnetic flux density in the iron cores (the first iron core 11, the second iron core 12, the recessed iron core 111, and the protruding iron core 112) is denoted by B1, the sectional area of iron cores (the first iron core 11, the second iron core 12, the recessed iron core 111, and the protruding iron core 112) is denoted by S, the length of the gap is denoted by Ld, and it is assumed that each of these parameters is equal in the reactor illustrated in FIG. 1A and FIG. 1B and the reactor disclosed in Japanese Unexamined Patent Publication (Kokai) No. S55-53404. In addition, the magnetic flux density in the gap 20 between the first iron core 11 and the second iron core 12 is denoted by B2, and the magnetic flux density in the gap 120 between the recessed iron core 111 and the protruding iron core 112 is denoted by B3.

An effective area of the first gap-facing surface 21 and the second gap-facing surface 22 of the reactor 1 according to the first embodiment of the present disclosure, illustrated in FIG. 1A and FIG. 1B, is given by 2P(=P*2). For the reactor 101 disclosed in Japanese Unexamined Patent Publication (Kokai) No. S55-53404, an effective area of the gap-facing surfaces is given by "$2P(1-\alpha)$." The magnetic flux flowing from a portion near the outer periphery of the gap-facing surface of the protruding iron core 112 does not flow into the gap-facing surface of the recessed iron core 111. The area of the gap-facing surface of the protruding iron core 112 from which such magnetic flux not flowing into the gap-facing surface of the recessed iron core 111 flows out is given by $2P\alpha$.

In the reactor 1 according to the first embodiment of the present disclosure, illustrated in FIG. 1A and FIG. 1B, since the magnetic flux penetrating through the cross-sectional area S of the first iron core 11 or the second iron core 12 is equal to the sum of the magnetic flux penetrating through the effective area 2P of the first gap-facing surface 21 and the second gap-facing surface 22 and the leakage flux, equation 1 holds when the product of the leakage flux times the area of the portion where the leakage flux is generated is denoted by X.

$$B1 \times S = B2 \times 2P + X \tag{1}$$

Since the magnetic flux density in the gap is determined by the magnetic flux density B1 in the iron core and the gap length Ld, the magnetic flux densities B2 and B3 of the gaps may be represented as equation 2.

$$B2=B3 \tag{2}$$

Therefore, magnetic energy W1 accumulated in the gap 20 of the reactor 1 according to the first embodiment of the present disclosure, illustrated in FIG. 1A and FIG. 1B, is represented as equation 3 where the magnetic permeability is $\mu_0$.

$$W1 = \tfrac{1}{2} \times \mu_0 \times B2^{\wedge 2} \times 2P \times Ld \tag{3}$$

In the reactor 101 disclosed in Japanese Unexamined Patent Publication (Kokai) No. S55-53404, since the magnetic flux penetrating through the cross-sectional area S of the recessed iron core 111 or the protruding iron core 112 is equal to the sum of the magnetic flux penetrating through the effective area "$2P(1-\alpha)$" of the gap-facing surfaces and the leakage flux, equation 4 holds when the product of the leakage flux times the area of the portion where the leakage flux is generated is denoted by Y.

$$B1 \times S = B3 \times 2P(1-\alpha) + Y \tag{4}$$

As a result, the magnetic energy W2 accumulated in the gap 120 of the reactor 101 disclosed in Japanese Unexamined Patent Publication (Kokai) No. S55-53404 is represented as equation 5 where the magnetic permeability is $\mu_0$.

$$\begin{aligned} W2 &= \frac{1}{2} \times \mu_0 \times B3^{\wedge 2} \times 2P(1-\alpha) \times Ld \\ &= \frac{1}{2} \times \mu_0 \times B2^{\wedge 2} \times 2P \times Ld - \left(\frac{\alpha}{2} \times \mu_0 \times B2^{\wedge 2} \times 2P \times Ld\right) \end{aligned} \tag{5}$$

With regard to the magnetic flux densities of the gaps, there is a relation "B2=B3." Thus, in comparison between equation 3 and equation 5, the magnetic energy accumulated in the gap is larger in the reactor 1 according to the first embodiment of the present disclosure, illustrated in FIG. 1A and FIG. 1B than in the reactor 101 disclosed in Japanese Unexamined Patent Publication (Kokai) No. S55-53404.

A magnetic resistance is represented by a formula "a gap length divided by a magnetic permeability and an area." The effective area of the gap of the reactor 1 according to the first embodiment of the present disclosure, illustrated in FIG. 1A and FIG. 1B, is larger than that of the gap of the reactor 101 disclosed in Japanese Unexamined Patent Publication (Kokai) No. S55-53404, and it is given by "$P(1-\alpha)<P$." As a result, the magnetic resistance is lower in the reactor 1 according to the first embodiment of the present disclosure, illustrated in FIG. 1A and FIG. 1B than in the reactor 101 disclosed in Japanese Unexamined Patent Publication (Kokai) No. S55-53404. In other words, the magnetic resistance of the gap of the reactor 1 according to the first embodiment of the present disclosure is lower, and the magnetic flux and the magnetic flux density as well as the inductance can be increased under a condition in which the amount of current is the same. Thus, the small reactor 1 can be realized.

As described above, in the reactor 1 according to the first embodiment of the present disclosure, by setting the thickness of the first iron core 11 around the gap to be larger than that of a portion of the first iron core 11 closer to the gap and that of the second iron core 12, the first gap-facing surface 21 is configured to have a larger area than the second gap-facing surface 22 (in other words, it is configured such that the outer peripheral edge formed by the line of intersection of the first gap-facing surface 21 and the surface 31 adjacent to the first gap-facing surface 21 has a length longer than the outer peripheral edge formed by the line of intersection of the second gap-facing surface 22 and the surface 32 adjacent to the second gap-facing surface 22).

Figure 5A:
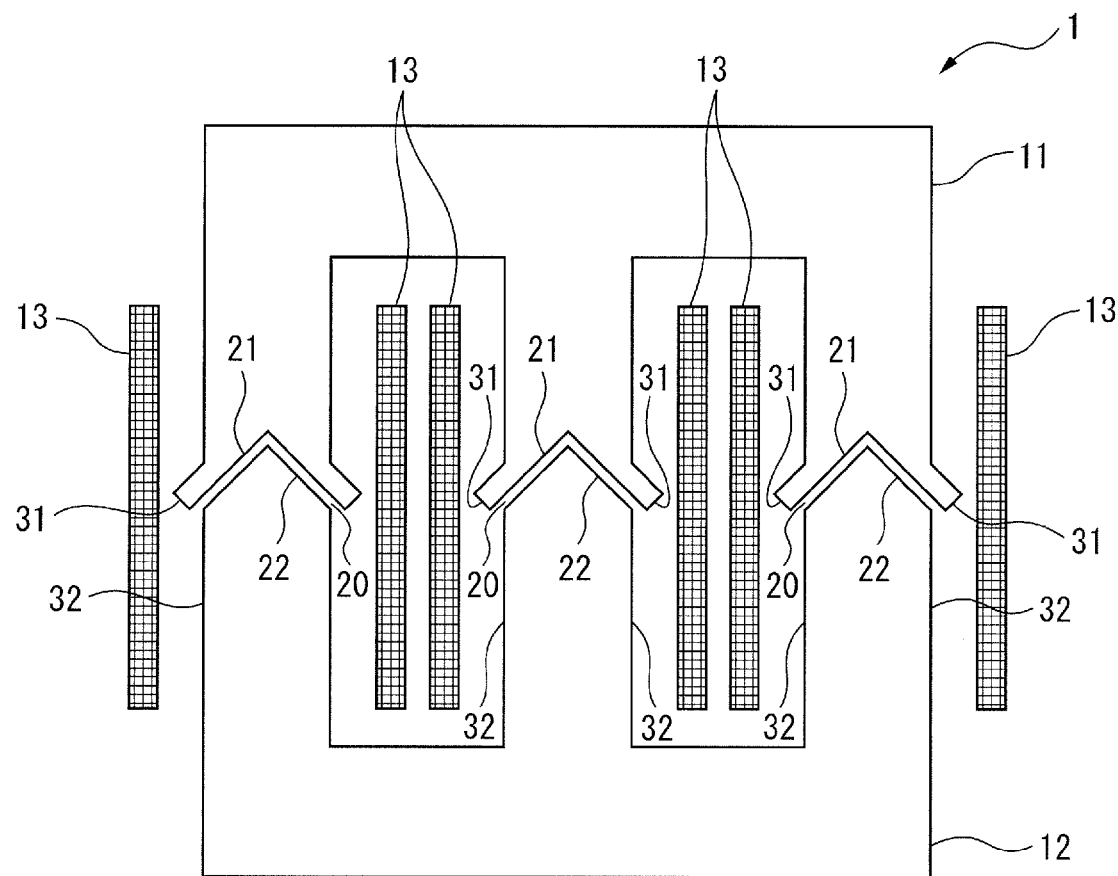
FIG. 5A is a diagram illustrating a reactor according to a second embodiment of the present disclosure, and a full sectional view schematically illustrating a structure of the reactor.
Figure 5B:
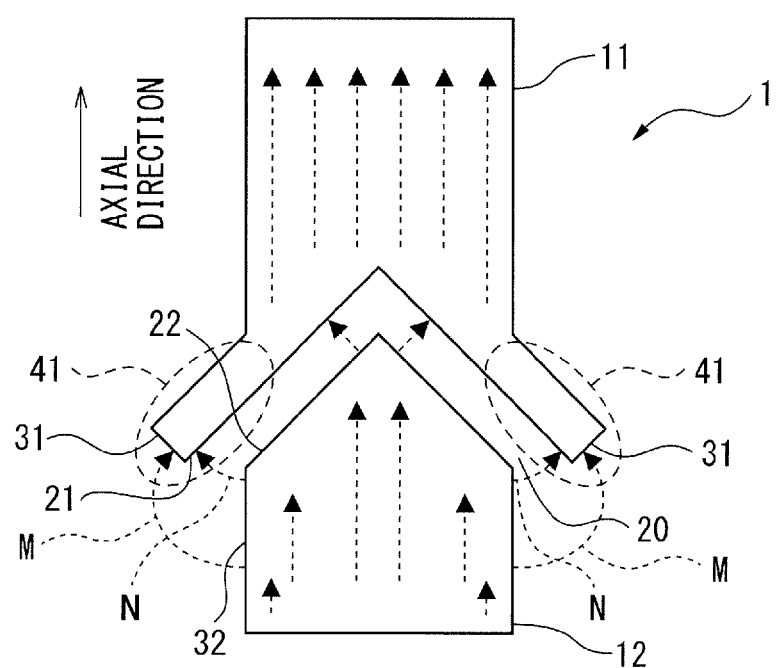
FIG. 5B is a diagram illustrating a reactor according to the second embodiment of the present disclosure, and a partial sectional view schematically illustrating magnetic flux generated in the reactor.

Next, as a second embodiment of the present disclosure, an example will be described in which the area of the first gap-facing surface 21 according to the first embodiment of the present disclosure is enlarged. FIG. 5A is a diagram illustrating a reactor according to the second embodiment of the present disclosure, and a full sectional view schematically illustrating a structure of the reactor. FIG. 5B is a diagram illustrating the reactor according to the second embodiment of the present disclosure, and a partial sectional view schematically illustrating magnetic flux generated in the reactor. As illustrated in FIG. 5A and FIG. 5B, in the second embodiment of the present disclosure, a projection portion 41 is configured by further extending the projection portion 40 in the first embodiment of the present disclosure, illustrated in FIG. 1A and FIG. 1B. With this configuration, as illustrated in FIG. 5B, magnetic flux N flowing out from a portion of a surface 32 near the gap, of magnetic flux vertically flowing out from the surface 32 (i.e., a side surface of a second iron core 12) adjacent to a second gap-facing surface 22 of the second iron core 12, will vertically flow into a first gap-facing surface 21 of a first iron core 11. Furthermore, since the projection portion 41 is larger, magnetic flux M flowing out from a portion of the surface 32 located farther from the portion near the gap will vertically flow into the surface 31 adjacent to the first gap-facing surface 21 of the first iron core 11. Thus, since the magnetic flux, which is leakage flux in the first embodiment, vertically flows into the surface 31 adjacent to the first gap-facing surface 21 of the first iron core 11 and passes through the first iron core 11; therefore, according to the second embodiment of the present disclosure, the magnetic flux density in the first iron core 11 is higher than that in the first embodiment of the present disclosure. The larger the projection portion 41 (i.e., the larger the area of the first gap-facing surface 21 as long as it is up to about 1.5 times larger the area of the second gap-facing surface 22), the higher the magnetic flux density in the first iron core 11. Note that, also in the second embodiment, the first iron core 11 and the second iron core 12 may be in contact with each other at a region other than the first gap-facing surface 21 and the second gap-facing surface 22 or may be formed integrally.

Figure 8A:
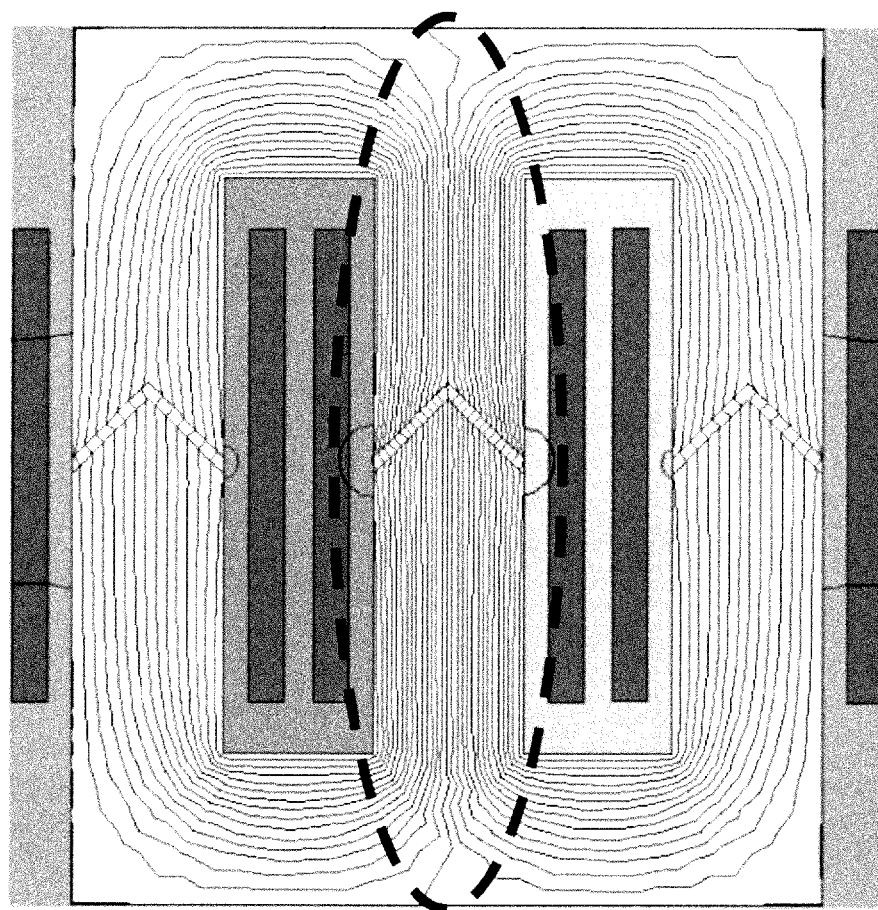
FIG. 8A is a diagram illustrating a simulation result of a magnetic flux density in the reactor according to an invention disclosed in Japanese Unexamined Patent Publication (Kokai) No. S55-53404, and a diagram for explaining change in magnetic flux density associated with a variation of the shape of a gap.
Figure 8B:
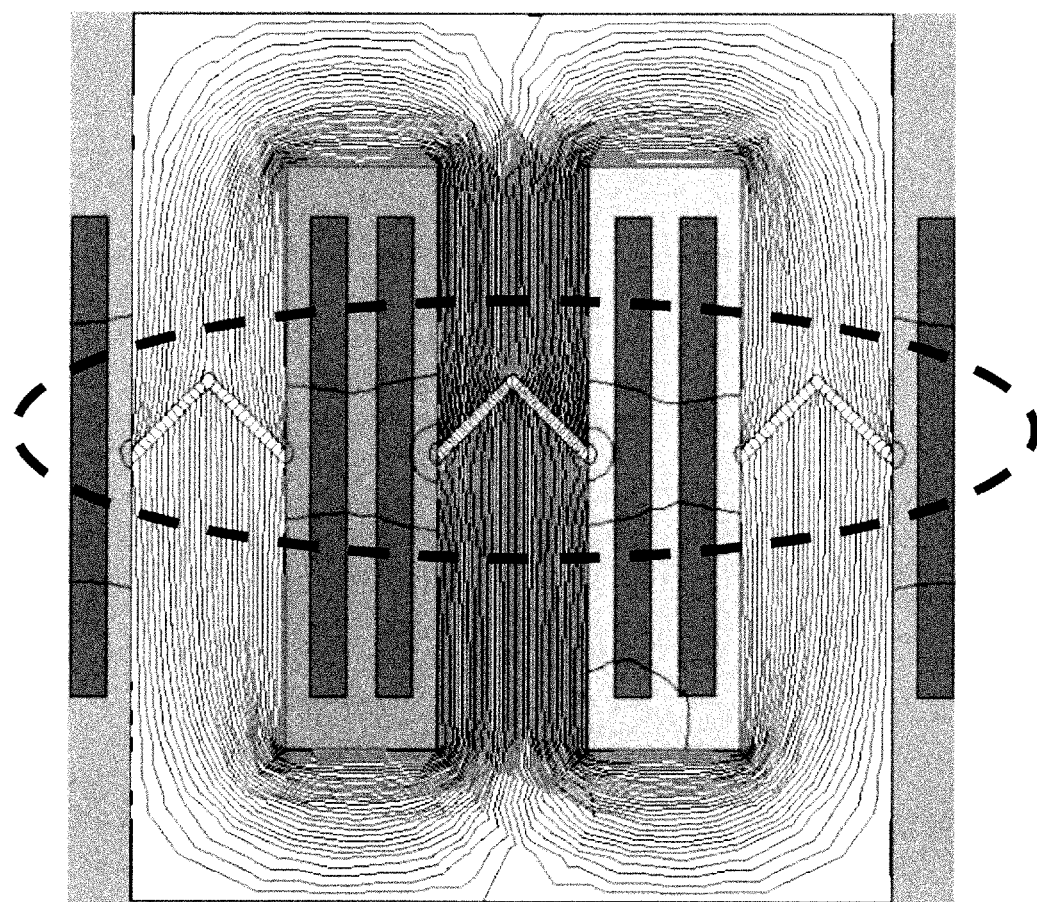
FIG. 8B is a diagram illustrating a simulation result of a magnetic flux density in the reactor according to the invention disclosed in Japanese Unexamined Patent Publication (Kokai) No. S55-53404, and a diagram for explaining change in magnetic flux density associated with a variation of the shape of a gap under a condition where inductance is constant.
Figure 8C:
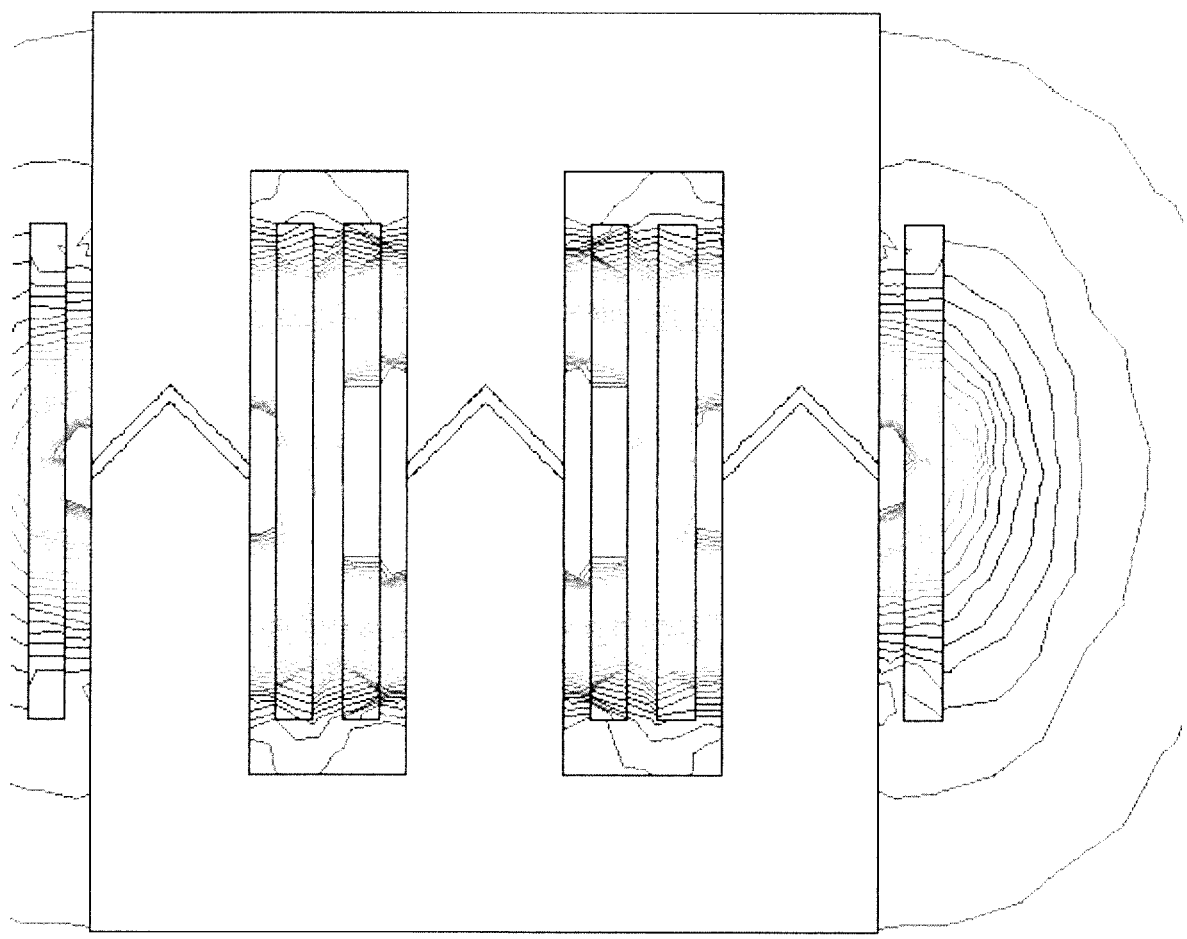
FIG. 8C is a diagram illustrating a simulation result of a magnetic flux density in the reactor according to the invention disclosed in Japanese Unexamined Patent Publication (Kokai) No. S55-53404, and a diagram for explaining change in magnetic flux density near a gap associated with a variation of the shape of a gap under a condition where inductance is constant.
Figure 9:
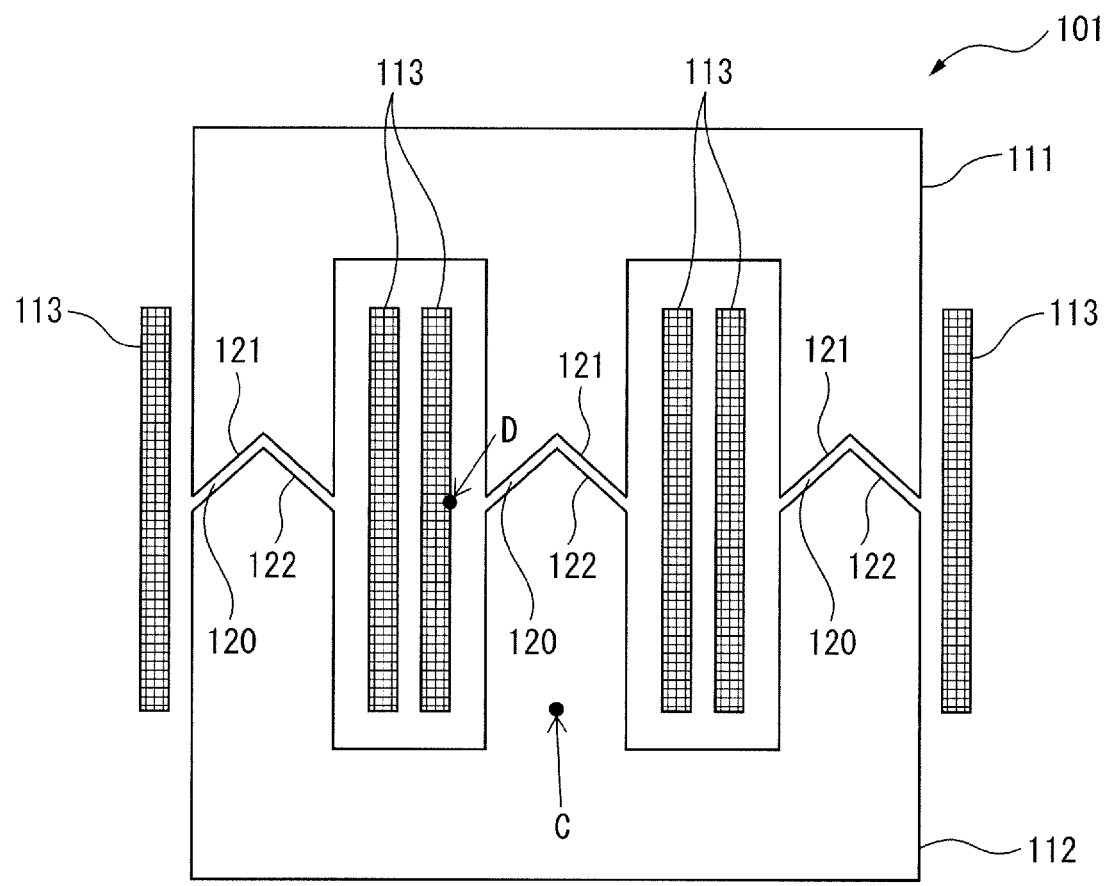
FIG. 9 is a diagram illustrating observation points of a magnetic flux density in the reactor in the simulation analysis.
Figure 30A:
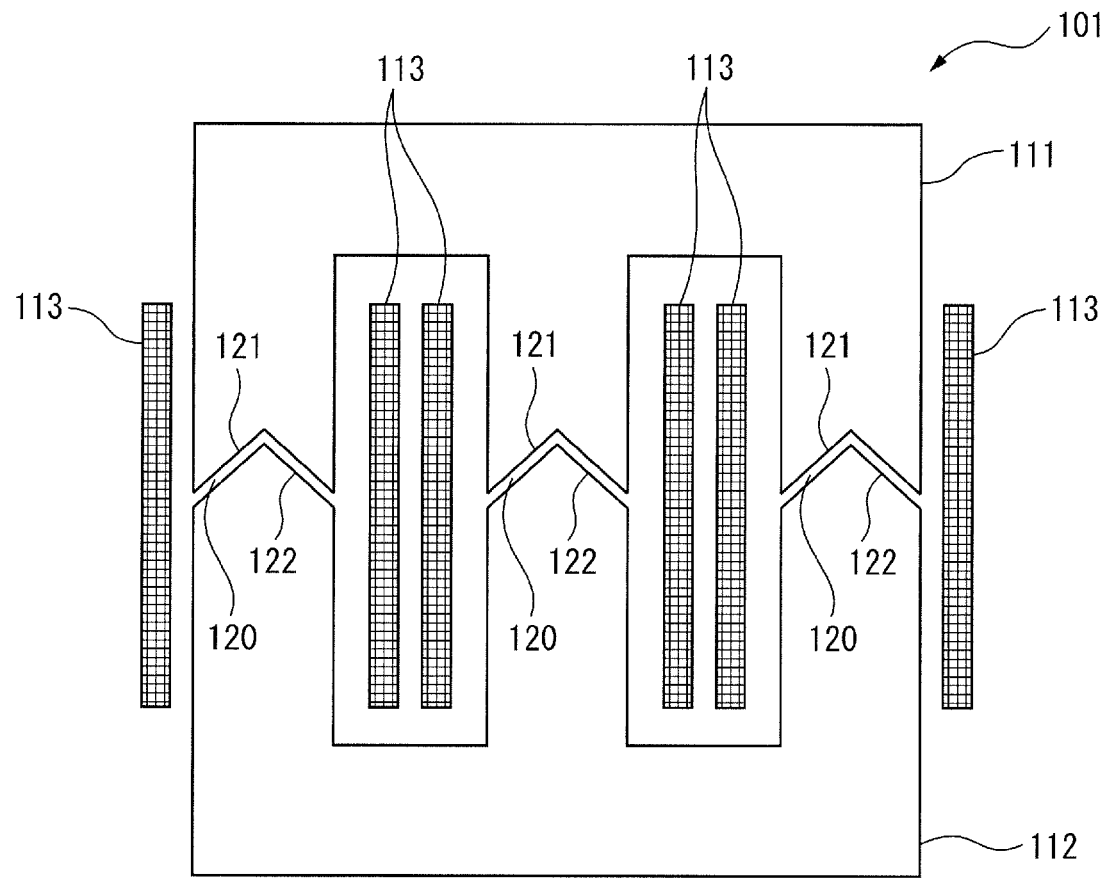
FIG. 30A is a diagram for explaining leakage flux in the reactor according to the invention disclosed in Japanese Unexamined Patent Publication (Kokai) No. S55-53404, and a full sectional view schematically illustrating a structure of the reactor.
Figure 30B:
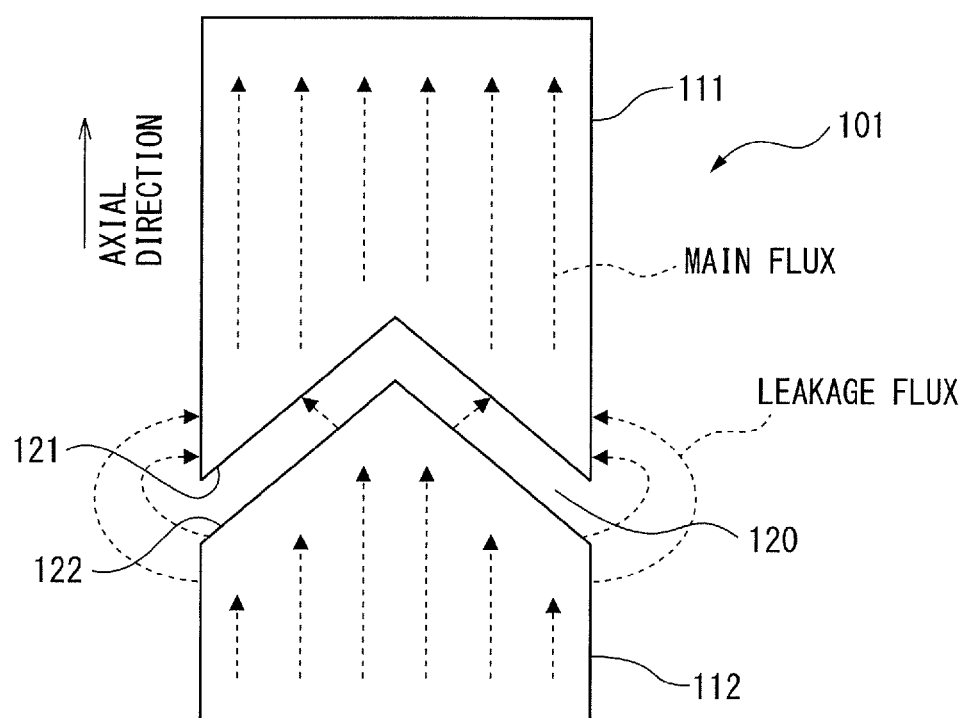
FIG. 30B is a diagram for explaining leakage flux in the reactor according to the invention disclosed in Japanese Unexamined Patent Publication (Kokai) No. S55-53404, and a partial sectional view schematically illustrating magnetic flux generated in the reactor.

As described above, since the shapes of the gap-facing surfaces (as well as the areas of the surfaces) of the reactor according to the first embodiment of the present disclosure, the reactor according to the second embodiment of the present disclosure, and the reactor according to the invention disclosed in Japanese Unexamined Patent Publication (Kokai) No. S55-53404 are different, the shapes of the corresponding gaps between iron cores are different. The results of simulation with regard to change in gap lengths in the reactors according to the first and second embodiments of the present disclosure and the reactor according to the invention disclosed in Japanese Unexamined Patent Publication (Kokai) No. S55-53404 will be described using FIG. 6A, FIG. 6B, FIG. 6C, FIG. 7A, FIG. 7B, FIG. 7C, FIG. 8A, FIG. 8B, and FIG. 8C. FIG. 9 is a diagram illustrating observation points of the magnetic flux density in the reactor in the simulation analysis. While the reactor according to the invention disclosed in Japanese Unexamined Patent Publication (Kokai) No. S55-53404, illustrated in FIG. 30A, is taken as an example in FIG. 9, similar points are also used as observation points of the magnetic flux density in the reactors according to the first and second embodiments of the present disclosure. Point C indicates an observation point of the magnetic flux density in the iron core, and point D indicates an observation point of the magnetic flux density in the winding.

Figure 6A:
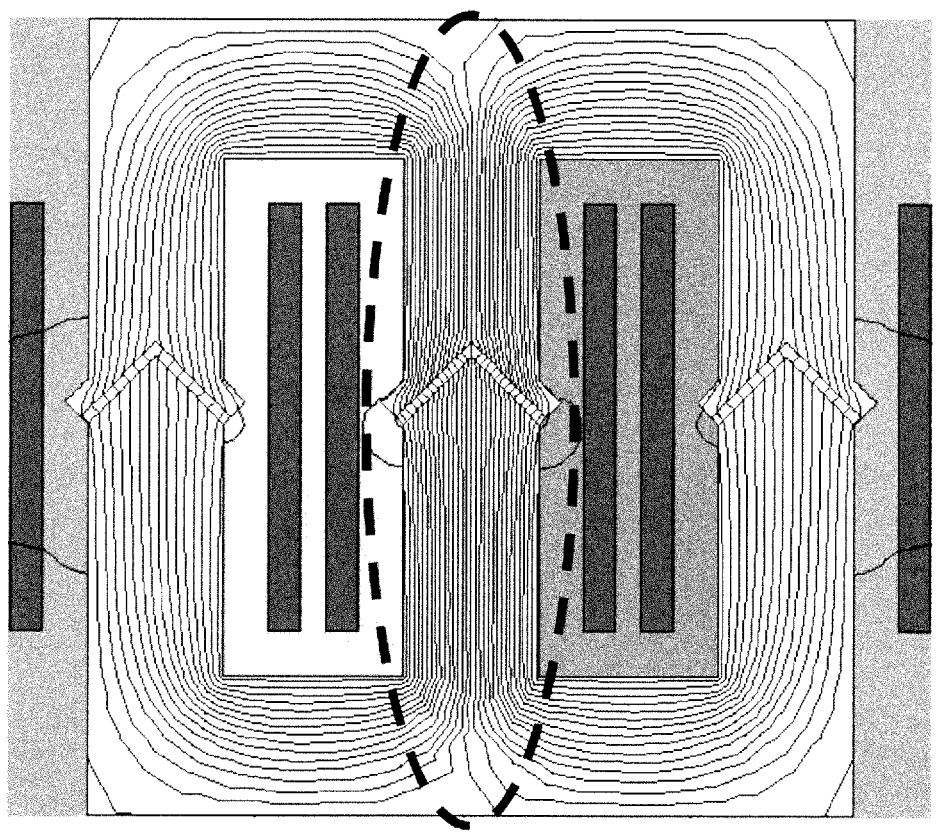
FIG. 6A is a diagram illustrating a simulation result of a magnetic flux density in the reactor according to the first embodiment of the present disclosure, and a diagram for explaining change in magnetic flux density associated with a variation of the shape of a gap.
Figure 6B:
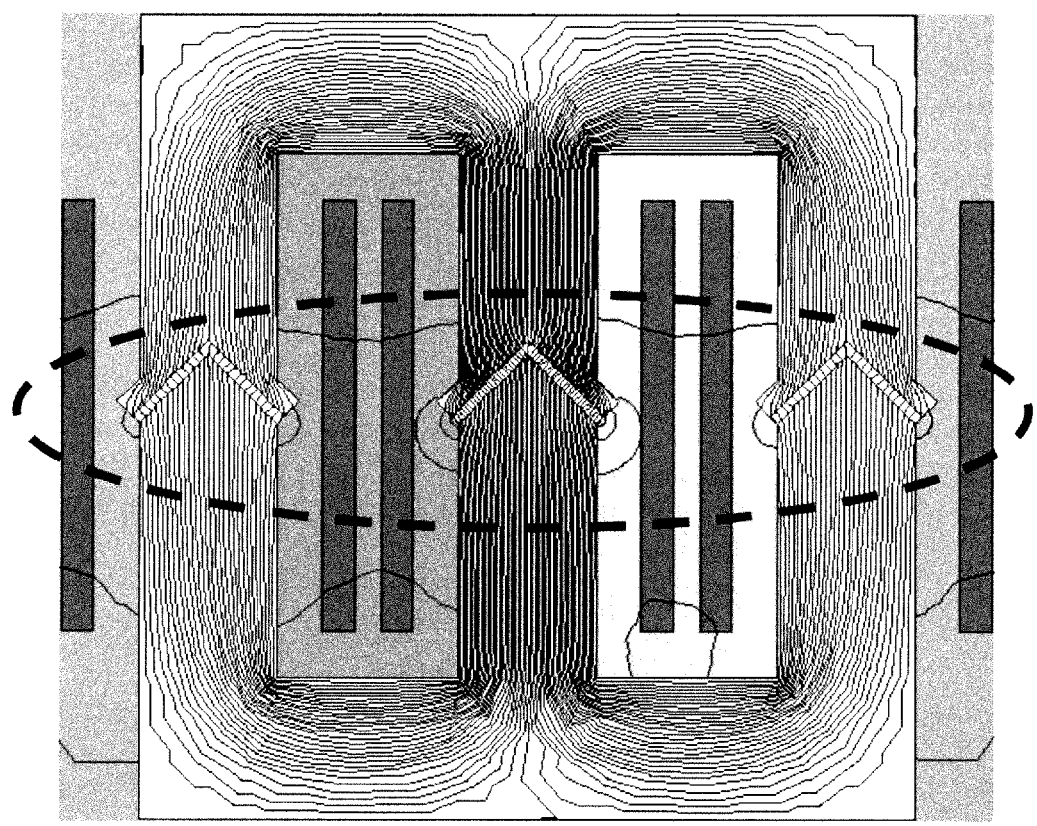
FIG. 6B is a diagram illustrating a simulation result of a magnetic flux density in the reactor according to the first embodiment of the present disclosure, and a diagram for explaining change in magnetic flux density associated with a variation of the shape of a gap under a condition where inductance is constant.
Figure 6C:
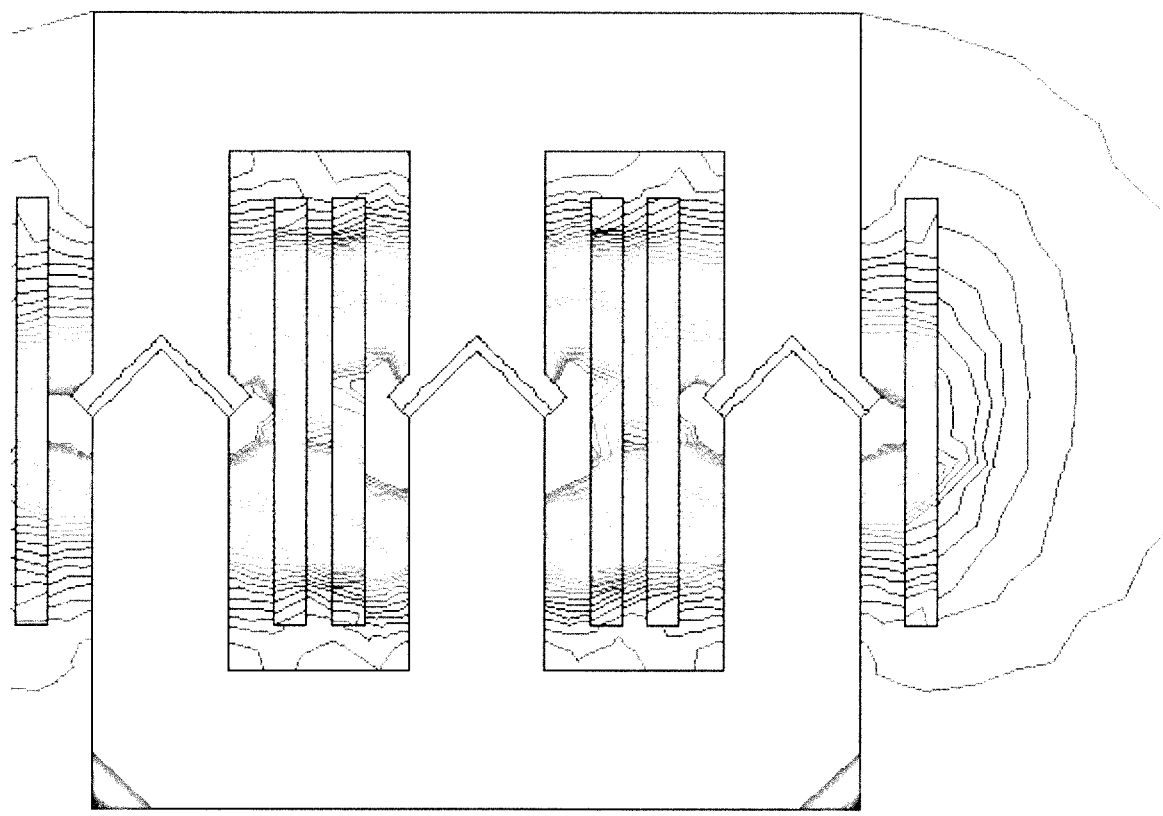
FIG. 6C is a diagram illustrating a simulation result of a magnetic flux density in the reactor according to the first embodiment of the present disclosure, and a diagram for explaining change in magnetic flux density near a gap associated with a variation of the shape of a gap under a condition where inductance is constant.
Figure 7A:
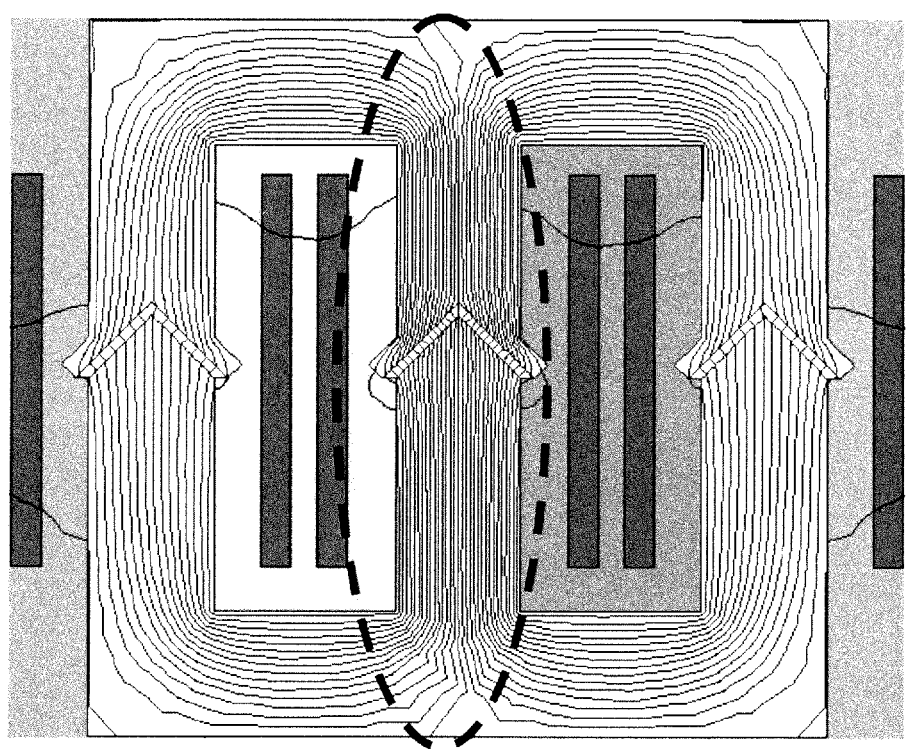
FIG. 7A is a diagram illustrating a simulation result of a magnetic flux density in the reactor according to the second embodiment of the present disclosure, and a diagram for explaining change in magnetic flux density associated with a variation of the shape of a gap.
Figure 7B:
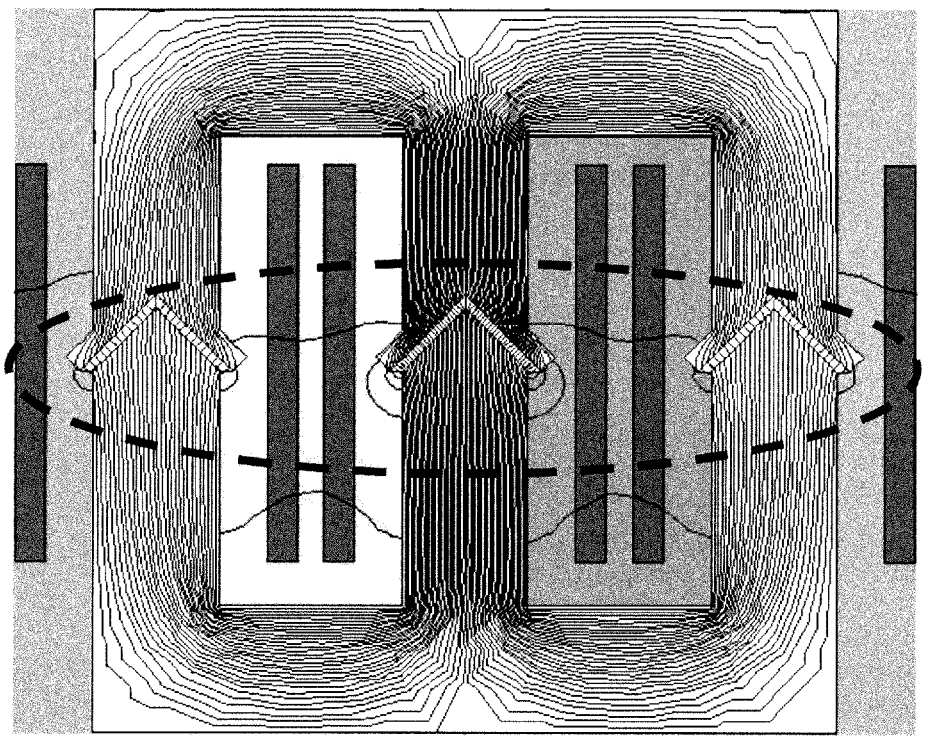
FIG. 7B is a diagram illustrating a simulation result of a magnetic flux density in the reactor according to the second embodiment of the present disclosure, and a diagram for explaining change in magnetic flux density associated with a variation of the shape of a gap under a condition where inductance is constant.
Figure 7C:
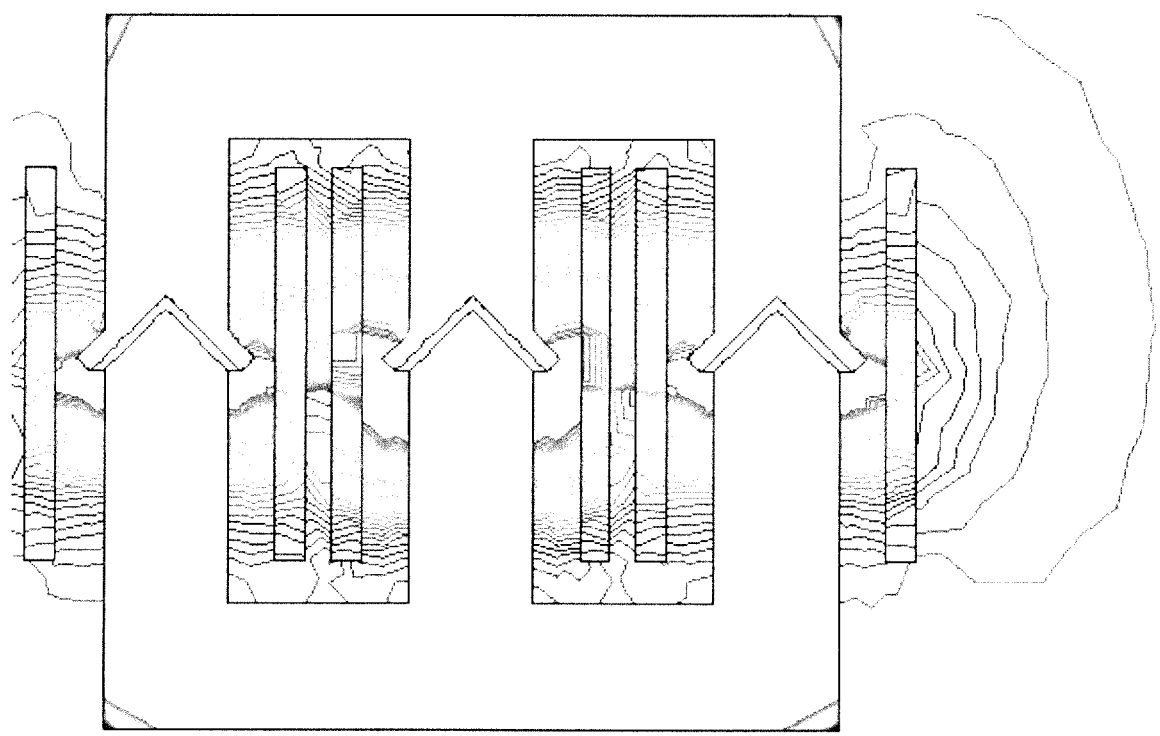
FIG. 7C is a diagram illustrating a simulation result of a magnetic flux density in the reactor according to the second embodiment of the present disclosure, and a diagram for explaining change in magnetic flux density near a gap associated with a variation of the shape of a gap under a condition where inductance is constant.

FIG. 6A, FIG. 6B, and FIG. 6C are diagrams illustrating simulation results of the magnetic flux density in the reactor according to the first embodiment of the present disclosure; FIG. 6A is a diagram for explaining change in magnetic flux density associated with a variation of the shape of a gap; FIG. 6B is a diagram for explaining change in magnetic flux density associated with a variation of the shape of a gap under a condition where inductance is constant; FIG. 6C is a diagram for explaining change in magnetic flux density near a gap associated with a variation of the shape of a gap under a condition where inductance is constant. FIG. 6C illustrates the magnetic flux density of the leakage flux in the winding near the gap in the central leg portion of the reactor illustrated in FIG. 6B by means of isograms. FIG. 7A, FIG. 7B, and FIG. 7C are diagrams illustrating simulation results of the magnetic flux density in the reactor according to the second embodiment of the present disclosure; FIG. 7A is a diagram for explaining change in magnetic flux density associated with a variation of the shape of a gap; FIG. 7B is a diagram for explaining change in magnetic flux density associated with a variation of the shape of a gap under a condition where inductance is constant; FIG. 7C is a diagram for explaining change in magnetic flux density near a gap associated with a variation of the shape of a gap under a condition where inductance is constant. FIG. 7C illustrates the magnetic flux density of the leakage flux in the winding near the gap in the central leg portion of the reactor illustrated in FIG. 7B by means of isograms. FIG. 8A, FIG. 8B, and FIG. 8C are diagrams illustrating simulation results of the magnetic flux density in the reactor according to the invention disclosed in Japanese Unexamined Patent Publication (Kokai) No. S55-53404; FIG. 8A is a diagram for explaining change in magnetic flux density associated with a variation of the shape of a gap; FIG. 8B is a diagram for explaining change in magnetic flux density associated with a variation of the shape of a gap under a condition where inductance is constant; FIG. 8C is a diagram for explaining change in magnetic flux density near a gap associated with a variation of the shape of a gap under a condition where inductance is constant. FIG. 8C illustrates the magnetic flux density of the leakage flux in the winding near the gap in the central leg portion of the reactor illustrated in FIG. 8B by means of isograms.

Table 1 illustrates change in magnetic flux density in the iron cores associated with variations of the shapes of gaps in FIG. 6A, FIG. 7A, and FIG. 8A as numerical values.

|  | Inductance [mH] | Magnetic flux density in iron core [T] |
|---|---|---|
| FIG. 8A Conventional art | 0.1138 | 1.4191 |
| FIG. 6A First embodiment | 0.1222 | 1.4829 |
| FIG. 7A Second embodiment | 0.1245 | 1.5002 |

As already described, the effective area or the gap between iron cores is larger in order of the reactor according to the invention disclosed in Japanese Unexamined Patent Publication (Kokai) No. S55-53404 (FIG. 8A), the reactor according to the first embodiment of the present disclosure (FIG. 6A), and the reactor according to the second embodiment of the present disclosure (FIG. 7A), it is determined from the figures and Table 1 that the magnetic flux density in the iron cores increases as the effective area of the gap between the iron cores increases. This is because magnetic flux M flowing out from a portion of the surface 32 of one of the iron cores (the second iron core 12) located farther from the portion near the gap will be more likely to vertically flow into the surface adjacent to the gap-facing surface of the other iron core (the first iron core 11) as the projection portion 41 is larger (i.e., as the area of the first gap-facing surface 21 is larger than that of the second gap-facing surface 22). In addition, the inductance is higher in order of the reactor according to the invention disclosed in Japanese Unexamined Patent Publication (Kokai) No. S55-53404 (FIG. 8A), the reactor according to the first embodiment of the present disclosure (FIG. 6A), and the reactor according to the second embodiment of the present disclosure (FIG. 7A). This is because α in equation 5 becomes smaller as the projection portion 41 is larger (i.e., as the area of the first gap-facing surface 21 is larger than that of the second gap-facing surface 22), and thus, the inductance increases.

Table 2 illustrates change in magnetic flux density in the iron cores and change in maximum magnetic flux density in the winding, which are associated with variations of the shapes of gaps under a condition where inductance is constant in FIG. 6B and FIG. 6C, FIG. 7B and FIG. 7C, and FIG. 8B and FIG. 8C as numerical values.

|  | Magnetic flux density in iron core [T] | Maximum magnetic flux density in winding [T] |
|---|---|---|
| FIG. 8B and FIG. 8C Conventional art | 1.1325 | 0.109 |
| FIG. 6B and FIG. 6C First embodiment | 1.1336 | 0.064 |
| FIG. 7B and FIG. 7C Second embodiment | 1.1345 | 0.059 |

In the simulation of FIG. 6B and FIG. 6C, FIG. 7B and FIG. 7C, and FIG. 8B and FIG. 8C, the numbers of turns of the windings and the amount of current are adjusted such that the magnetic flux density in the iron cores is approximately constant (the inductance is approximately constant) for each reactor. In addition, the dimensions are adjusted such that the distances from the projection portion 40 of the iron core 11 or a peripheral surface of the iron core 111 to the winding located in the vicinity are equal. While the effective area of the gap between iron cores are larger in order of the reactor according to the invention disclosed in Japanese Unexamined Patent Publication (Kokai) No. S55-53404 (FIG. 8B and FIG. 8C), the reactor according to the first embodiment of the present disclosure (FIG. 6B and FIG. 6C), and the reactor according to the second embodiment of the present disclosure (FIG. 7B and FIG. 7C) as already described, it is determined from the figures and Table 2 that the magnetic flux density in the winding decreases as the effective area of the gap between the iron cores increases. As is apparent from comparison among FIG. 6C, FIG. 7C, and FIG. 8C, it is determined that a region having a lower magnetic flux density in the winding is larger in the reactor (FIG. 6C) according to the first embodiment of the present disclosure and the reactor (FIG. 7C) according to the second embodiment of the present disclosure than in the reactor (FIG. 8C) according to the invention disclosed in Japanese Unexamined Patent Publication (Kokai) No. S55-53404. This is because magnetic flux M flowing out from a portion of the surface 32 of one of the iron cores (the second iron core 12) located farther from the portion near the gap will be more likely to vertically flow into the surface adjacent to the gap-facing surface of the other iron core (the first iron core 11) as the projection portion 41 is larger (i.e., as the area of the first gap-facing surface 21 is larger than that of the second gap-facing surface 22), and thus, the leakage flux into the winding decreases.

Next, third to eighth embodiments will be described with reference to FIG. 10 to FIG. 15 as further variations of the shapes of the first gap-facing surface and the second gap-facing surface according to the first and second embodiments described above. In FIG. 10 to FIG. 15, illustration of the winding 13 is omitted.

First, in the third embodiment of the present disclosure, a bottom portion (i.e., recessed portion) of a recessed shape and a top portion (i.e., a projection portion) of a protruding shape, which are formed by slanted surfaces, are configured to include a curved shape in each of a first gap-facing surface and a second gap-facing surface.

Figure 10:
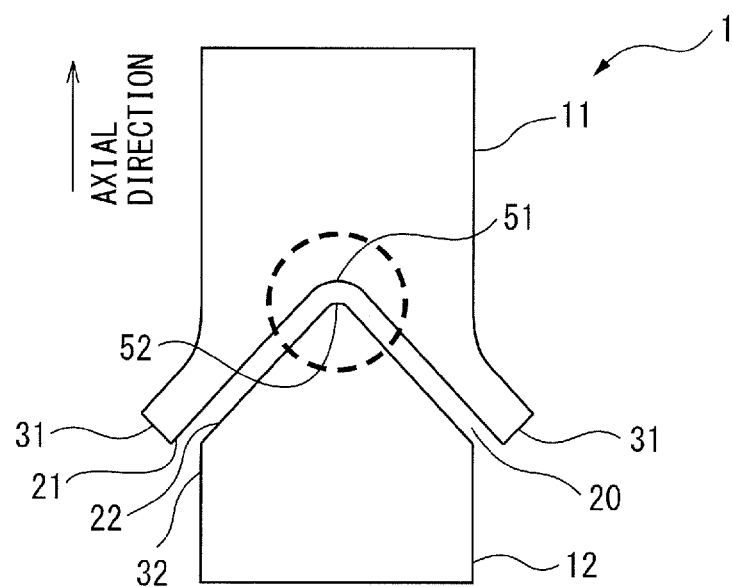
FIG. 10 is a partial sectional view illustrating a reactor according to a third embodiment of the present disclosure.

FIG. 10 is a partial sectional view illustrating a reactor according to the third embodiment of the present disclosure. As an example, description is made with respect to the first gap-facing surface 21 and the second gap-facing surface 22 in the first embodiment described with reference to FIG. 1A and FIG. 1B; however, the beforementioned or aforementioned embodiments can be applied to gap-facing surfaces according to other embodiments, which was described above or will be described hereinafter. As illustrated in FIG. 10, the bottom portion of the recessed shape of a first gap-facing surface 21 of a first iron core 11 includes a curved shape 51 while the top portion of the protruding shape of a second gap-facing surface 22 of a second iron core 12 includes a curved shape 52.

In fourth to sixth embodiments of the present disclosure, the effective areas of the gap-facing surfaces are configured to be larger by increasing the thickness of the body of one of the iron cores to be larger than that of the body of the other iron core.

Figure 11:
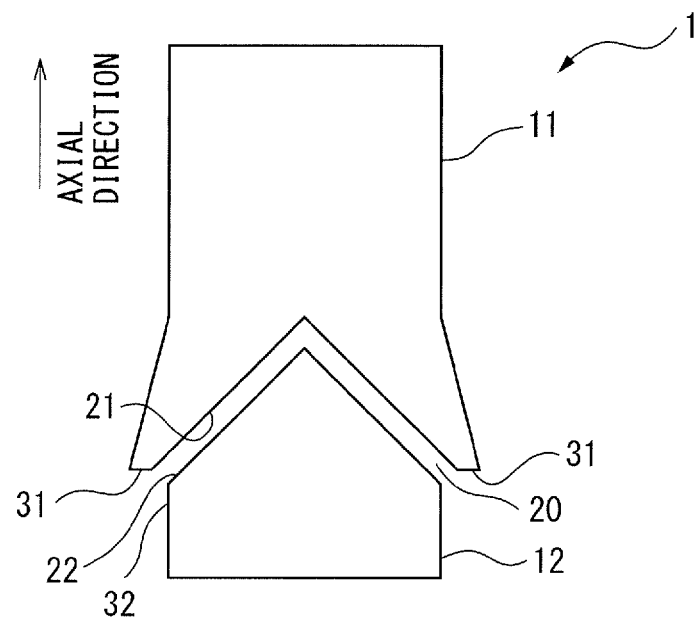
FIG. 11 is a partial sectional view illustrating a reactor according to a fourth embodiment of the present disclosure.
Figure 12:
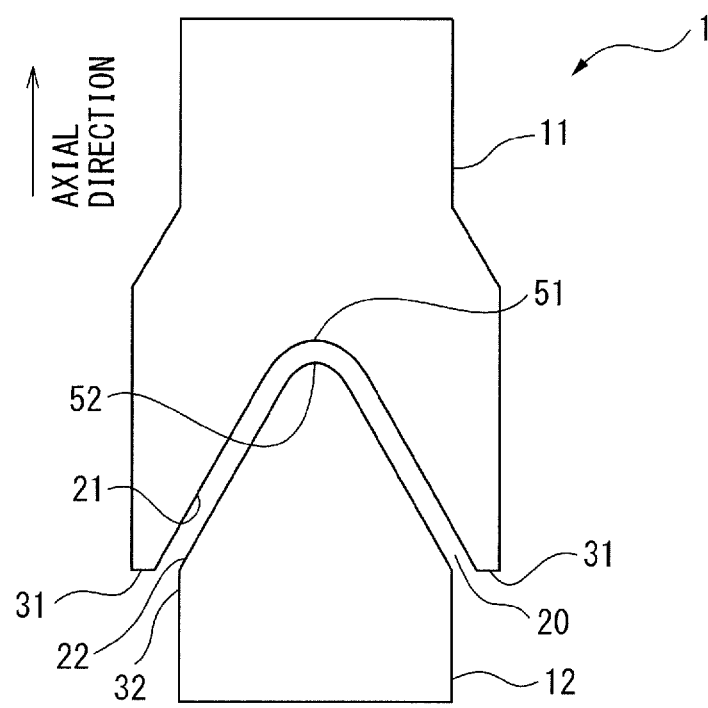
FIG. 12 is a partial sectional view illustrating a reactor according to a fifth embodiment of the present disclosure.
Figure 13:
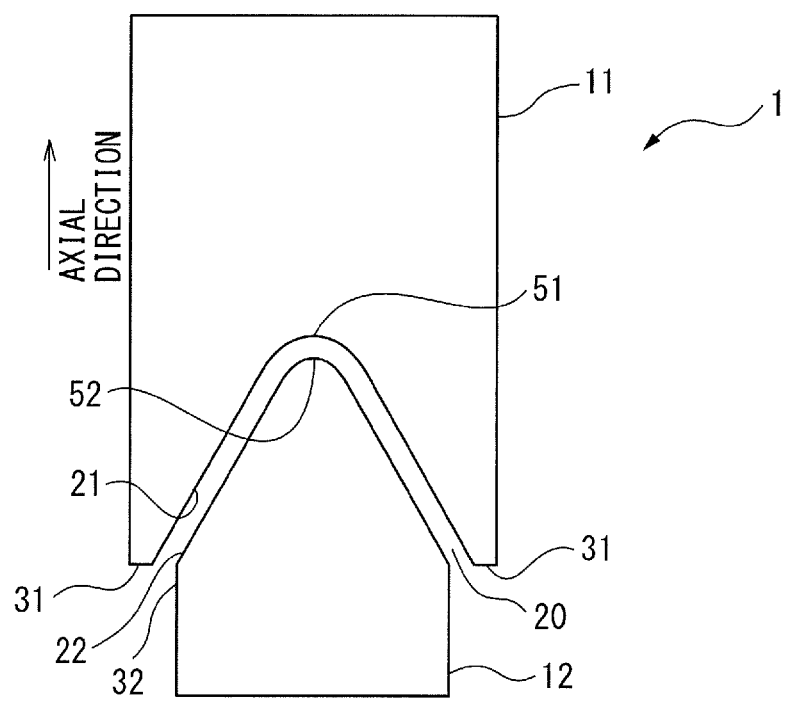
FIG. 13 is a partial sectional view illustrating a reactor according to a sixth embodiment of the present disclosure.

FIG. 11 is a partial sectional view illustrating a reactor according to the fourth embodiment of the present disclosure. FIG. 12 is a partial sectional view illustrating a reactor according to a fifth embodiment of the present disclosure. FIG. 13 is a partial sectional view illustrating a reactor according to the sixth embodiment of the present disclosure. In each of the fourth to sixth embodiments, a first gap-facing surface 21 is configured to have a larger area than a second gap-facing surface 22 by increasing the thickness of the body of a first iron core 11 to be larger than that of the body of a second iron core 12. Note that the third embodiment is further applied to the reactor 1 according to the fifth embodiment illustrated in FIG. 12 and the reactor 1 according to the sixth embodiment illustrated in FIG. 13 such that the bottom portion of the recessed shape of the first gap-facing surface 21 includes a curved shape 51 while the top portion of the protruding shape of the second gap-facing surface 22 includes a curved shape 52.

The seventh and eighth embodiments of the present disclosure are further variations of the gap-facing surfaces.

Figure 14:
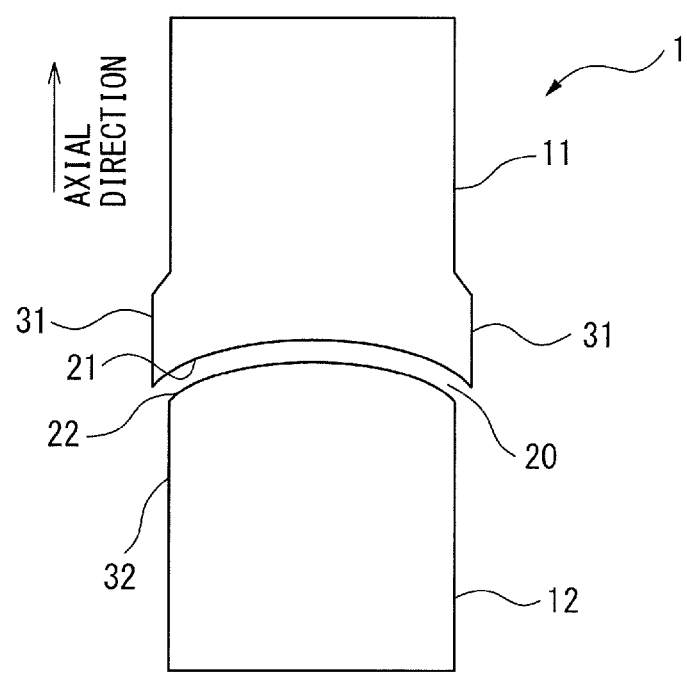
FIG. 14 is a partial sectional view illustrating a reactor according to a seventh embodiment of the present disclosure.

FIG. 14 is a partial sectional view illustrating a reactor according to the seventh embodiment of the present disclosure. In the seventh embodiment of the present disclosure illustrated in FIG. 14, an outer peripheral edge formed by the line of intersection of a first gap-facing surface 21 of a first iron core 11 and a surface 31 adjacent to the first gap-facing surface 21 is configured to have a length longer than an outer peripheral edge formed by the line of intersection of a second gap-facing surface 22 of a second iron core 12 and a surface 32 adjacent to the second gap-facing surface 22; furthermore, the first gap-facing surface 21 and the second gap-facing surface 22 are configured to include a meandering shape.

Figure 15:
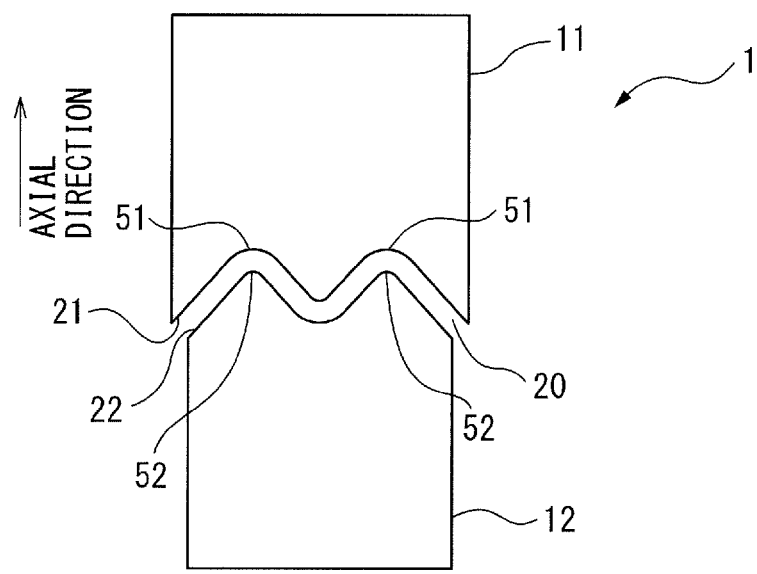
FIG. 15 is a partial sectional view illustrating a reactor according to an eighth embodiment of the present disclosure.

FIG. 15 is a partial sectional view illustrating a reactor according to the eighth embodiment of the present disclosure. In the eighth embodiment of the present disclosure illustrated in FIG. 15, a first gap-facing surface 21 is configured to have a larger area than a second gap-facing surface 22; furthermore, the first gap-facing surface 21 and the second gap-facing surface 22 are configured to include a recessed shape(s) and a protruding shape(s) formed alternately. More specifically, in order to configure the first gap-facing surface 21 to have a larger area than the second gap-facing surface 22, recessed shapes and protruding shapes, the number of which is one less than that of the recessed shapes, are formed alternately in the first gap-facing surface 21, and recessed shapes and protruding shapes, the number of which is one greater than that of the recessed shapes, are formed alternately in the second gap-facing surface 22. In an example illustrated in FIG. 15, two recessed shapes are formed and one protruding shape is formed in the first gap-facing surface 21 while one recessed shape is formed and two protruding shapes are formed in the second gap-facing surface 22. Note that the third embodiment is further applied to the reactor 1 according to the eighth embodiment illustrated in FIG. 15 such that the bottom portion of the recessed shape of the first gap-facing surface 21 includes a curved shape 51 while the top portion of the protruding shape of the second gap-facing surface 22 includes a curved shape 52.

Note that, also in the third to eighth embodiments described above, the first iron core 11 and the second iron core 12 may be in contact with each other at a region other than the first gap-facing surface 21 and the second gap-facing surface 22 or may be formed integrally.

Although description has been made for the reactors according to the first to eighth embodiments described above when the reactor is a three-phase reactor, a reactor according to one aspect of the present disclosure may be implemented as a single-phase reactor. FIG. 16A and FIG. 16B are full sectional views illustrating a reactor according to a ninth embodiment of the present disclosure. With regard to the reactor 1 according to the ninth embodiment of the present disclosure, which is implemented as a single-phase reactor, the configuration is, as illustrated in FIG. 16A for example, similar to the three-phase reactor according to the first embodiment described with reference to FIG. 1A and FIG. 1B. In addition, for example, if a portion of a first gap-facing surface 21 near an outer edge thereof of a first iron core 11 and an axial direction form an acute angle on the inner side of the first iron core 11, a portion of a second gap-facing surface 22 near an outer edge thereof of a second iron core 12 and an axial direction form an obtuse angle on the inner side of the second iron core 12, and the first gap-facing surface 21 of the first iron core 11 is configured to have a larger area than the second gap-facing surface 22 of the second iron core 12, a single-phase reactor may then be implemented with a structure other than the one illustrated in FIG. 16A; for example, the reactor may be configured as illustrated in FIG. 16B. Note that, also in the ninth embodiment, the first iron core 11 and the second iron core 12 may be in contact with each other at a region other than the first gap-facing surface 21 and the second gap-facing surface 22 or may be formed integrally.

Next, variations for realizing a reactor according to one aspect of the present disclosure as a prismatic reactor will be described with reference to FIG. 17A to FIG. 2B as tenth to fifteenth embodiments.

Figure 17A:
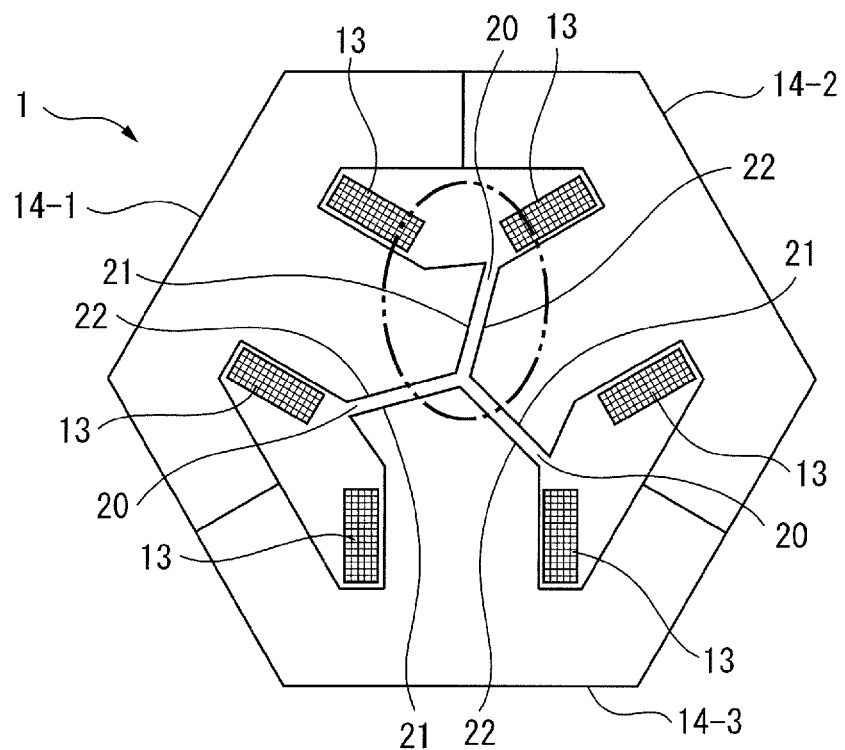
FIG. 17A is a view illustrating a reactor according to a tenth embodiment of the present disclosure.
Figure 17B:
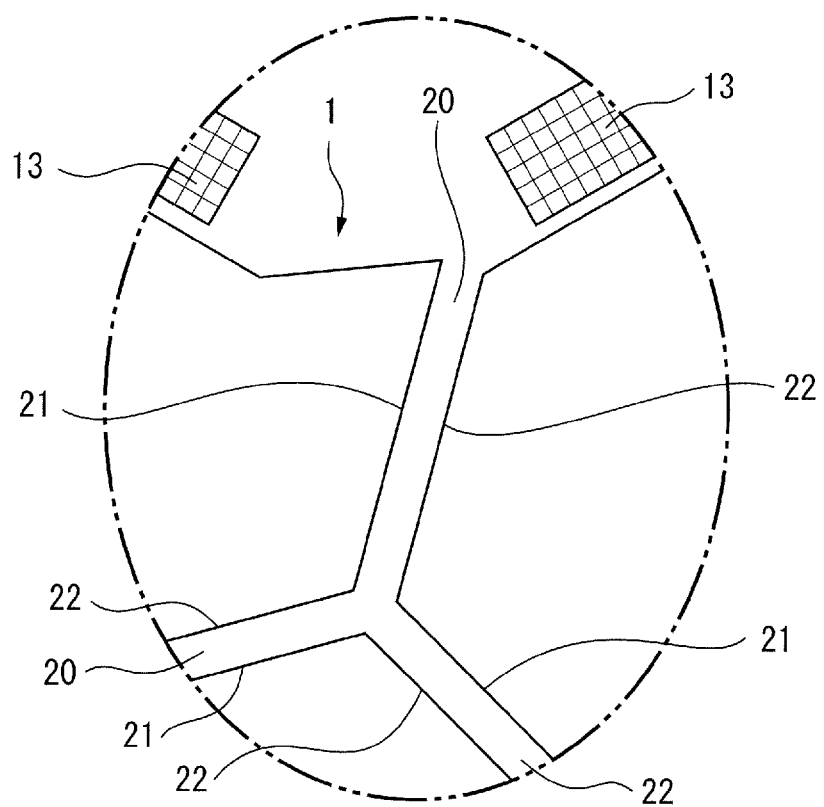
FIG. 17B is a view illustrating the reactor according to the tenth embodiment of the present disclosure, and an enlarged sectional view of a portion enclosed in the long dashed double-dotted line in FIG. 17A.

FIG. 17A is a full sectional view illustrating a reactor according to the tenth embodiment of the present disclosure. FIG. 17B is a view illustrating the reactor according to the tenth embodiment of the present disclosure, and an enlarged sectional view of a portion enclosed in the long dashed double-dotted line in FIG. 17A. The reactor 1 according to the tenth embodiment of the present disclosure is implemented as a prismatic three-phase reactor. In the reactor 1 according to the tenth embodiment of the present disclosure, as illustrated in FIG. 17A and FIG. 17B, gaps 20 are formed between an iron core 14-1 and an iron core 14-2, between the iron core 14-2 and an iron core 14-3, and between the iron core 14-3 and the iron core 14-1, wherein the iron cores are disposed in a substantially circumferential direction. In addition, each of the iron cores 14-1, 14-2, and 14-3 is provided with a first gap-facing surface 21, which faces against an iron core disposed side by side with the iron core concerned on one side, and a second gap-facing surface 22, which faces against the other iron core disposed side by side with the iron core concerned on the other side. More specifically, the iron core 14-1 is provided with the first gap-facing surface 21, which faces against the iron core 14-2 disposed side by side with the iron core concerned 14-1 on one side, and the second gap-facing surface 22, which faces against the iron core 14-3 disposed side by side with the iron core concerned 14-1 on the other side. The iron core 14-2 is provided with the first gap-facing surface 21, which faces against the iron core 14-3 disposed side by side with the iron core concerned 14-2 on one side, and the second gap-facing surface 22, which faces against the iron core 14-1 disposed side by side with the iron core concerned 14-2 on the other side. The iron core 14-3 is provided with the first gap-facing surface 21, which faces against the iron core 14-1 disposed side by side with the iron core concerned 14-3 on one side, and the second gap-facing surface 22, which faces against the iron core 14-2 disposed side by side with the iron core concerned 14-3 on the other side. Thus, in the tenth embodiment of the present disclosure, two iron cores disposed side by side with each other are configured such that the first gap-facing surface 21 of one of the iron cores faces against the second gap-facing surface 22 of the other iron core and the first gap-facing surface 21 has an area larger than the second gap-facing surface 22. The number of iron cores is determined by the number of poles of the reactor 1. For example, when the number of poles is two, the number of iron cores is two; when the number of poles is six, the number of iron cores is six. In the illustrated example, the number of poles of the reactor 1 is configured to be 3; however, the number of poles does not inherently limit the present embodiment and may be any other value. Furthermore, the shapes of the iron cores 14-1, 14-2, and 14-3 illustrated in FIG. 17A and FIG. 17B are merely examples and may be any shape as long as the first gap-facing surfaces 21 and the second gap-facing surfaces 22 have shapes that satisfy the aforementioned relation. Other embodiments with regard to the number of poles and the shapes of the iron cores will be described hereinafter with reference to FIG. 18 to FIG. 20B. When there are a plurality of pairs of the first gap-facing surface and the second gap-facing surface, inductance will increase and an effect of reducing leakage flux is exerted if the gap-facing surfaces of at least one pair of iron cores have shapes that satisfy the aforementioned relation. It would be readily understood that the effect will be maximal when all pairs of the gap-facing surfaces satisfy the aforementioned relation.

Figure 18:
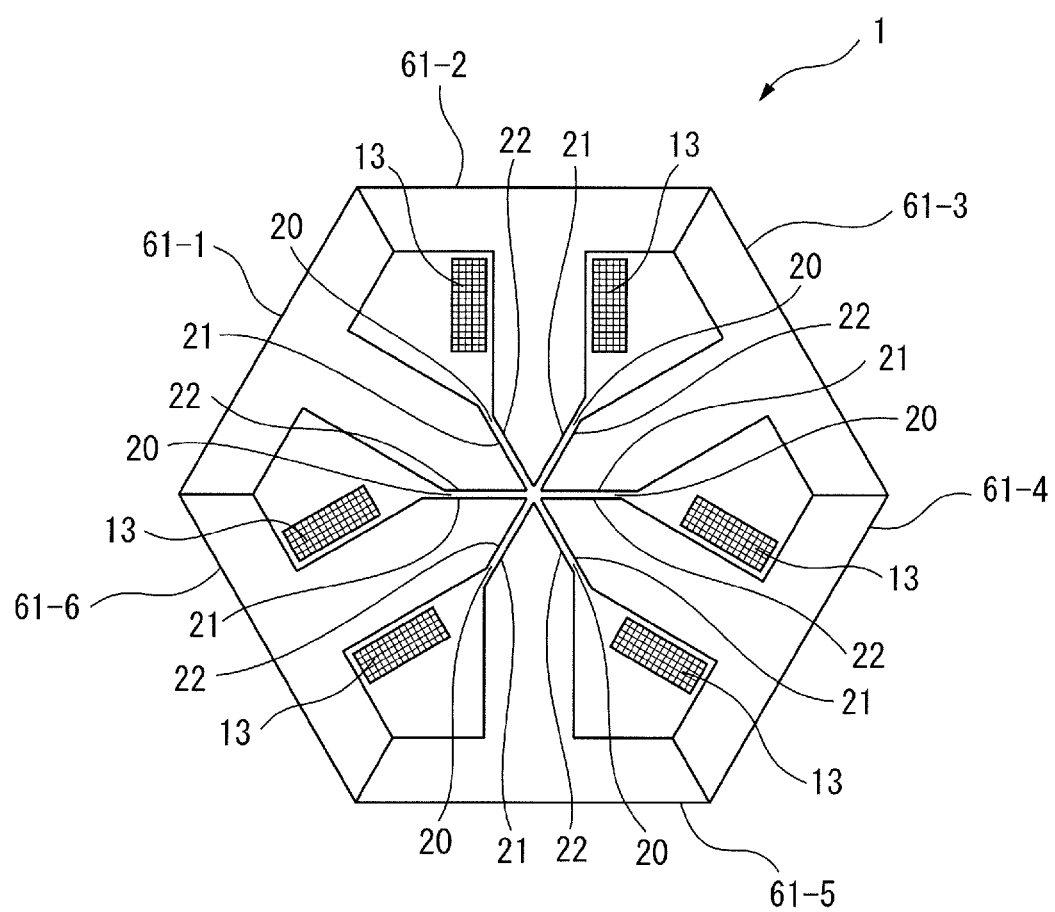
FIG. 18 is a full sectional view illustrating a reactor according to an eleventh embodiment of the present disclosure.

FIG. 18 is a full sectional view illustrating a reactor according to an eleventh embodiment of the present disclosure. The reactor 1 according to the eleventh embodiment of the present disclosure is implemented as a prismatic three-phase reactor. When the number of poles of iron core is greater than the number of phases, a winding 13 is wound on iron cores, the number of which corresponds to the number of phases (or a multiple thereof), of the iron cores. In an example illustrated in FIG. 18, iron cores 61-1, 61-2, 61-3, 61-4, 61-5, and 61-6, which constitute six poles, are disposed side by side with each other in a substantially circumferential direction, and a winding 13 is wound on three (in the illustrated example, reference numerals 61-2, 61-4, and 61-6) of the six iron cores since the reactor 1 is implemented as a three-phase reactor. In an example illustrated in FIG. 18, the iron cores 61-1, 61-2, 61-3, 61-4, 61-5, and 61-6 are configured to include a first gap-facing surface 21 and a second gap-facing surface 22, which are formed such that the edges thereof become sharper toward the center along a radial direction. Gaps 20 are formed between the iron core 61-1 and the iron core 61-2, between the iron core 61-2 and the iron core 61-3, between the iron core 61-3 and the iron core 61-4, between the iron core 61-4 and the iron core 61-5, between the iron core 61-5 and the iron core 61-6, and between the iron core 61-6 and the iron core 61-1, wherein the iron cores are disposed in a substantially circumferential direction. Each of the iron cores 61-1, 61-2, 61-3, 61-4, 61-5, and 61-6 is provided with the first gap-facing surface 21, which faces against an iron core disposed side by side with the iron core concerned on one side, and the second gap-facing surface 22, which faces against the other iron core disposed side by side with the iron core concerned on the other side. More specifically, the iron core 61-1 is provided with the first gap-facing surface 21, which faces against the iron core 61-2 disposed side by side with the iron core concerned 61-1 on one side, and the second gap-facing surface 22, which faces against the iron core 61-6 disposed side by side with the iron core concerned 61-1 on the other side. The iron core 61-2 is provided with the first gap-facing surface 21, which faces against the iron core 61-3 disposed side by side with the iron core concerned 61-2 on one side, and the second gap-facing surface 22, which faces against the iron core 61-1 disposed side by side with the iron core concerned 61-2 on the other side. The iron core 61-3 is provided with the first gap-facing surface 21, which faces against the iron core 61-4 disposed side by side with the iron core concerned 61-3 on one side, and the second gap-facing surface 22, which faces against the iron core 61-2 disposed side by side with the iron core concerned 61-3 on the other side. The iron core 61-4 is provided with the first gap-facing surface 21, which faces against the iron core 61-5 disposed side by side with the iron core concerned 61-4 on one side, and the second gap-facing surface 22, which faces against the iron core 61-3 disposed side by side with the iron core concerned 61-4 on the other side. The iron core 61-5 is provided with the first gap-facing surface 21, which faces against the iron core 61-6 disposed side by side with the iron core concerned 61-5 on one side, and the second gap-facing surface 22, which faces against the iron core 61-4 disposed side by side with the iron core concerned 61-5 on the other side. The iron core 61-6 is provided with the first gap-facing surface 21, which faces against the iron core 61-1 disposed side by side with the iron core concerned 61-6 on one side, and the second gap-facing surface 22, which faces against the iron core 61-5 disposed side by side with the iron core concerned 61-6 on the other side. Thus, also in the eleventh embodiment of the present disclosure, similarly to the aforementioned tenth embodiment, two iron cores disposed side by side with each other are configured such that the first gap-facing surface 21 of one of the iron cores faces against the second gap-facing surface 22 of the other iron core and the first gap-facing surface 21 has an area larger than the second gap-facing surface 22.

Figure 19A:
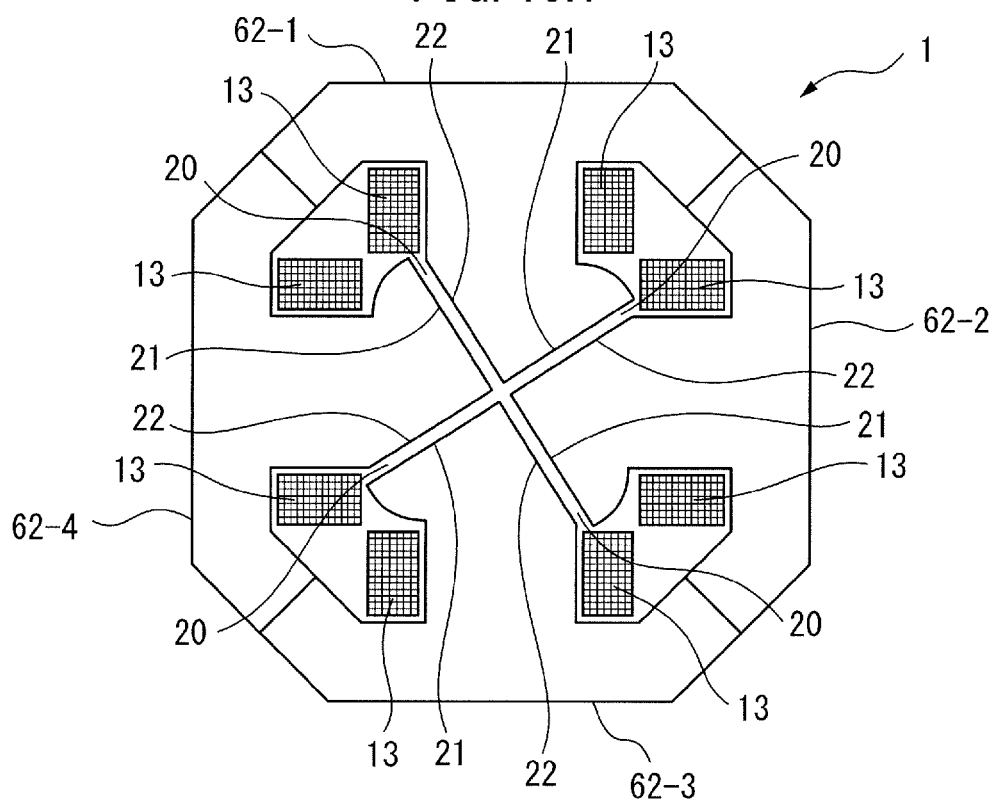
FIG. 19A is a full sectional view illustrating a reactor according to a twelfth embodiment of the present disclosure, and illustrates an example in which a winding is wound on all iron cores.
Figure 19B:
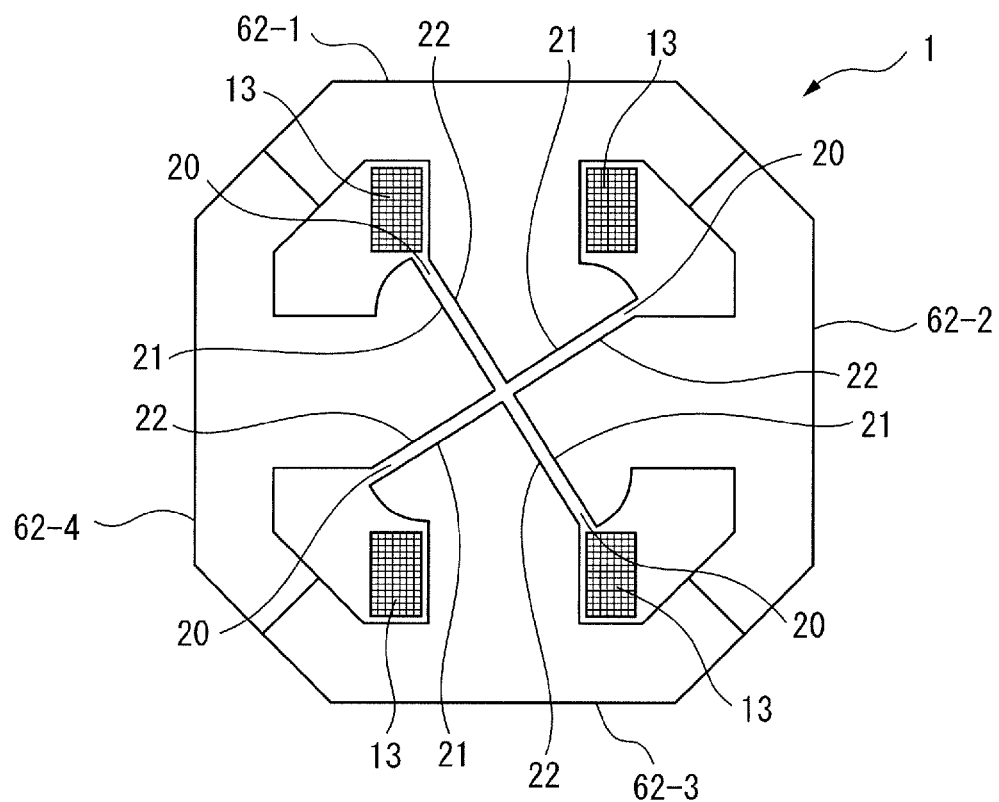
FIG. 19B is a full sectional view illustrating the reactor according to the twelfth embodiment of the present disclosure, and illustrates an example in which a winding is wound on some of the iron cores.

FIG. 19A is a full sectional view illustrating a reactor according to a twelfth embodiment of the present disclosure, and illustrates an example in which a winding is wound on all iron cores. FIG. 19B is a full sectional view illustrating the reactor according to the twelfth embodiment of the present disclosure, and illustrates an example in which a winding is wound on some of the iron cores. The reactor 1 according to the twelfth embodiment of the present disclosure is implemented as a prismatic single-phase reactor. In an example illustrated in FIG. 19A, iron cores 62-1, 62-2, 62-3, and 62-4, which constitute four poles, are disposed side by side with each other in a substantially circumferential direction, and a winding 13 is wound on all iron cores. Gaps 20 are formed between the iron core 62-1 and the iron core 62-2, between the iron core 62-2 and the iron core 62-3, between the iron core 62-3 and the iron core 62-4, and between the iron core 62-4 and the iron core 62-1, wherein the iron cores are disposed in a substantially circumferential direction. Each of the iron cores 62-1, 62-2, 62-3, and 62-4 is provided with a first gap-facing surface 21, which faces against an iron core disposed side by side with the iron core concerned on one side, and a second gap-facing surface 22, which faces against the other iron core disposed side by side with the iron core concerned on the other side. More specifically, the iron core 62-1 is provided with the first gap-facing surface 21, which faces against the iron core 62-2 disposed side by side with the iron core concerned 62-1 on one side, and the second gap-facing surface 22, which faces against the iron core 62-4 disposed side by side with the iron core concerned 62-1 on the other side. The iron core 62-2 is provided with the first gap-facing surface 21, which faces against the iron core 62-3 disposed side by side with the iron core concerned 62-2 on one side, and the second gap-facing surface 22, which faces against the iron core 62-1 disposed side by side with the iron core concerned 62-2 on the other side. The iron core 62-3 is provided with the first gap-facing surface 21, which faces against the iron core 62-4 disposed side by side with the iron core concerned 62-3 on one side, and the second gap-facing surface 22, which faces against the iron core 62-2 disposed side by side with the iron core concerned 62-3 on the other side. The iron core 62-4 is provided with the first gap-facing surface 21, which faces against the iron core 62-1 disposed side by side with the iron core concerned 62-4 on one side, and the second gap-facing surface 22, which faces against the iron core 62-3 disposed side by side with the iron core concerned 62-4 on the other side. Thus, also in the twelfth embodiment of the present disclosure, similarly to the aforementioned eleventh embodiment, two iron cores disposed side by side with each other are configured such that the first gap-facing surface 21 of one of the iron cores faces against the second gap-facing surface 22 of the other iron core and the first gap-facing surface 21 has an area larger than the second gap-facing surface 22. In an example illustrated in FIG. 19B, iron cores 62-1, 62-2, 62-3, and 62-4, which constitute four poles, are disposed side by side with each other in a substantially circumferential direction, and a winding 13 is wound on two (in the illustrated example, reference numerals 62-1 and 62-3) of the four iron cores. Since components other than these are similar to those illustrated in FIG. 19A, the same reference numerals denote the same components, and detailed description thereof is omitted.

Figure 20A:
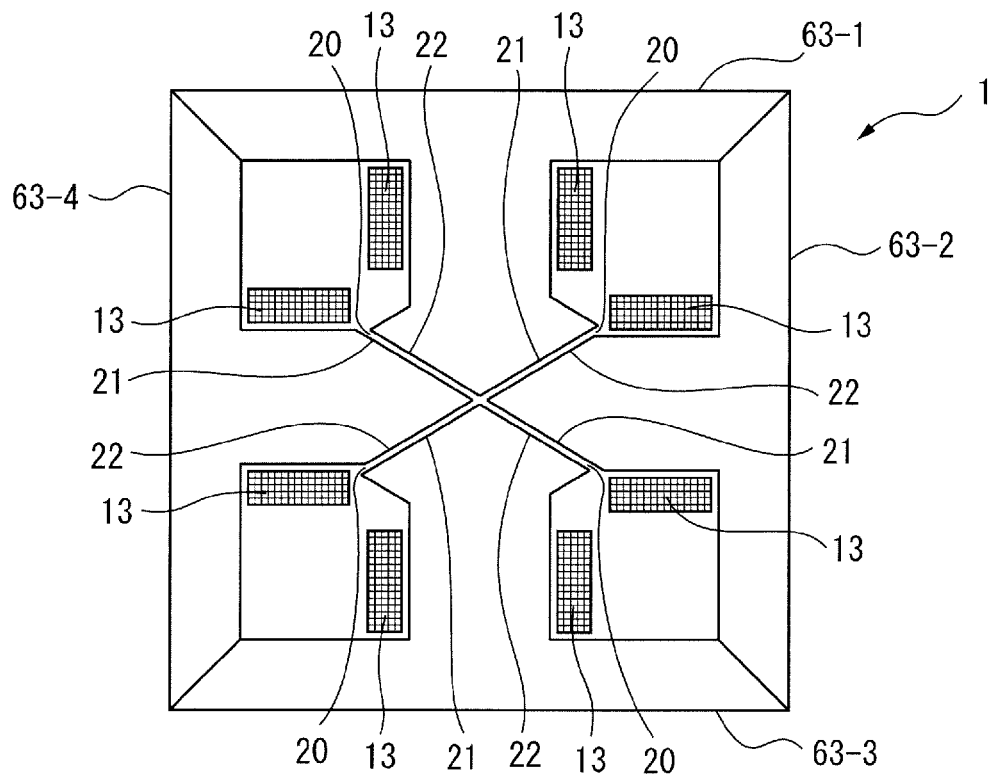
FIG. 20A is a full sectional view illustrating a reactor according to a thirteenth embodiment of the present disclosure, and illustrates an example in which a winding is wound on all iron cores.
Figure 20B:
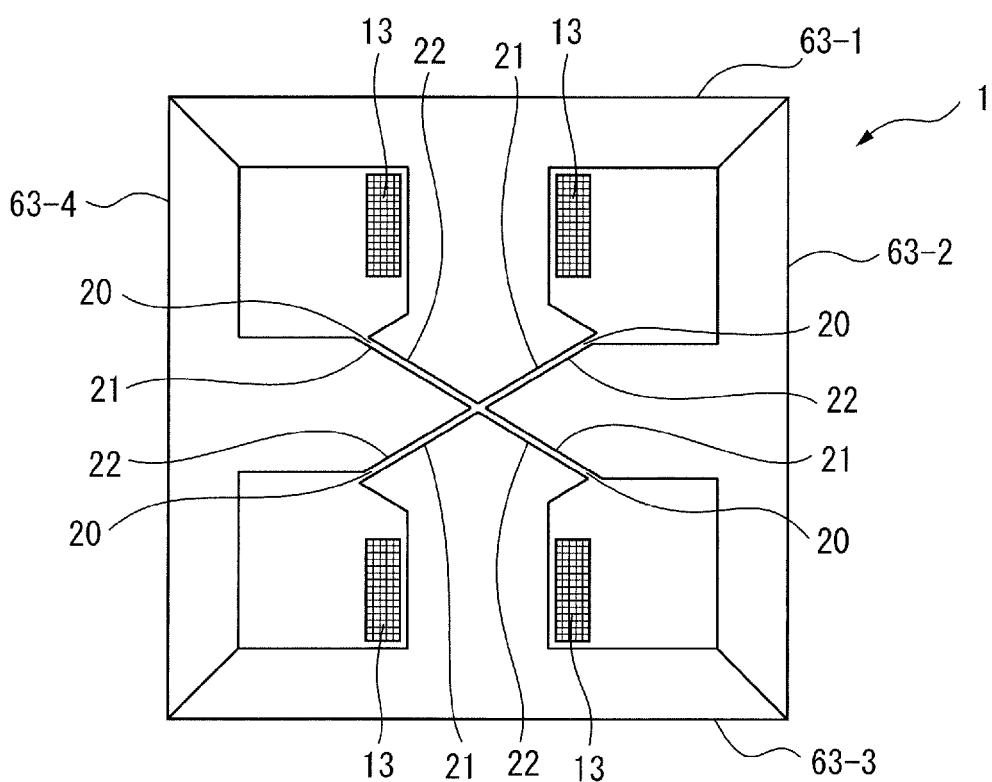
FIG. 20B is a full sectional view illustrating the reactor according to the thirteenth embodiment of the present disclosure, and illustrates an example in which a winding is wound on some of the iron cores.

FIG. 20A is a full sectional view illustrating a reactor according to a thirteenth embodiment of the present disclosure, and illustrates an example in which a winding is wound on all iron cores. FIG. 20B is a full sectional view illustrating the reactor according to the thirteenth embodiment of the present disclosure, and illustrates an example in which a winding is wound on some of the iron cores. The reactor 1 according to the thirteenth embodiment of the present disclosure is implemented, similarly to the twelfth embodiment described with reference to FIG. 19A and FIG. 19B, as a prismatic single-phase reactor; however, the shapes of the iron cores are different from those of the twelfth embodiment. In an example illustrated in FIG. 20A, iron cores 63-1, 63-2, 63-3, and 63-4, which constitute four poles, are disposed side by side with each other in a substantially circumferential direction, and a winding 13 is wound on all iron cores. Gaps 20 are formed between the iron core 63-1 and the iron core 63-2, between the iron core 63-2 and the iron core 63-3, between the iron core 63-3 and the iron core 63-4, and between the iron core 63-4 and the iron core 63-1, wherein the iron cores are disposed in a substantially circumferential direction. Each of the iron cores 63-1, 63-2, 63-3, and 63-4 is provided with a first gap-facing surface 21, which faces against an iron core disposed side by side with the iron core concerned on one side, and a second gap-facing surface 22, which faces against the other iron core disposed side by side with the iron core concerned on the other side. More specifically, the iron core 63-1 is provided with the first gap-facing surface 21, which faces against the iron core 63-2 disposed side by side with the iron core concerned 63-1 on one side, and the second gap-facing surface 22, which faces against the iron core 63-4 disposed side by side with the iron core concerned 63-1 on the other side. The iron core 63-2 is provided with the first gap-facing surface 21, which faces against the iron core 63-3 disposed side by side with the iron core concerned 63-2 on one side, and the second gap-facing surface 22, which faces against the iron core 63-1 disposed side by side with the iron core concerned 63-2 on the other side. The iron core 63-3 is provided with the first gap-facing surface 21, which faces against the iron core 63-4 disposed side by side with the iron core concerned 63-3 on one side, and the second gap-facing surface 22, which faces against the iron core 63-2 disposed side by side with the iron core concerned 63-3 on the other side. The iron core 63-4 is provided with the first gap-facing surface 21, which faces against the iron core 63-1 disposed side by side with the iron core concerned 63-4 on one side, and the second gap-facing surface 22, which faces against the iron core 63-3 disposed side by side with the iron core concerned 63-4 on the other side. Thus, also in the thirteenth embodiment of the present disclosure, similarly to the aforementioned twelfth embodiment, two iron cores disposed side by side with each other are configured such that the first gap-facing surface 21 of one of the iron cores faces against the second gap-facing surface 22 of the other iron core and the first gap-facing surface 21 has an area larger than the second gap-facing surface 22. In an example illustrated in FIG. 20B, iron cores 63-1, 63-2, 63-3, and 63-4, which constitute four poles, are disposed side by side with each other in a substantially circumferential direction, and a winding 13 is wound on two (in the illustrated example, reference numerals 63-1 and 63-3) of the four iron cores. Since components other than these are similar to those illustrated in FIG. 20A, the same reference numerals denote the same components, and detailed description thereof is omitted.

Figure 21A:
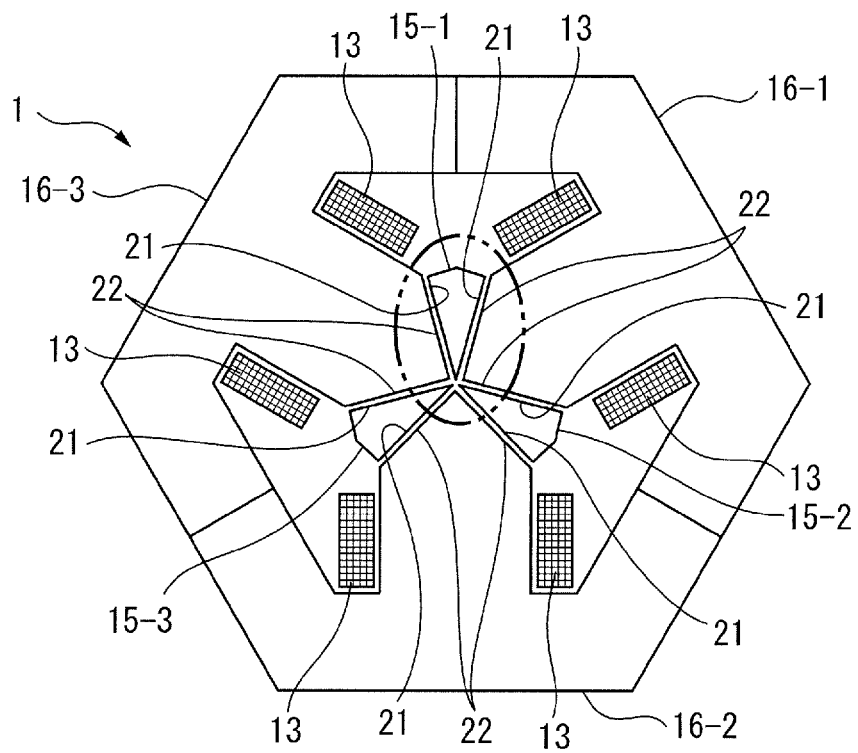
FIG. 21A is a full sectional view illustrating a reactor according to a fourteenth embodiment of the present disclosure.
Figure 21B:
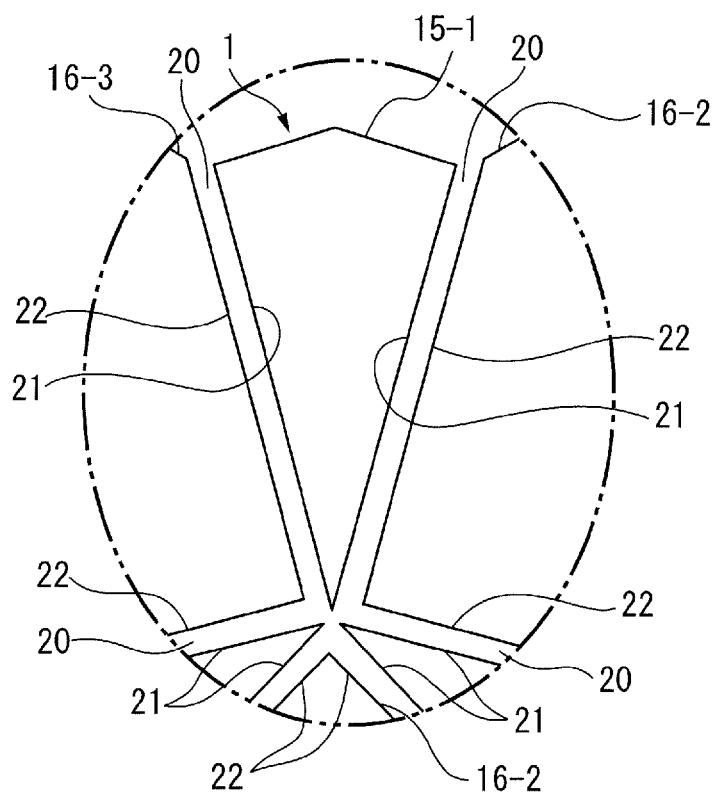
FIG. 21B is a view illustrating the reactor according to the fourteenth embodiment of the present disclosure, and an enlarged sectional view of a portion enclosed in the long dashed double-dotted line in FIG. 21A.

FIG. 21A is a full sectional view illustrating a reactor according to a fourteenth embodiment of the present disclosure. FIG. 21B is a view illustrating the reactor according to the fourteenth embodiment of the present disclosure, and an enlarged sectional view of a portion enclosed in the long dashed double-dotted line in FIG. 21A. The reactor 1 according to the fourteenth embodiment of the present disclosure is implemented as a prismatic three-phase reactor. According to the fourteenth embodiment of the present disclosure, the reactor 1 includes first iron cores 15-1, 15-2, and 15-3 each having two first gap-facing surfaces 21, second iron cores 16-1, 16-2, and 16-3 each having two second gap-facing surfaces 22 as surfaces facing against the first gap-facing surfaces 21, and windings 13. The first iron cores 15-1, 15-2, and 15-3 are disposed side by side with each other in a substantially circumferential direction. The second iron cores 16-1, 16-2, and 16-3 are also disposed side by side with each other in a substantially circumferential direction. As illustrated in FIG. 21A and FIG. 21B, gaps 20 are formed between the first iron core 15-1 and the second iron core 16-1, between the second iron core 16-1 and the first iron core 15-2, between the first iron core 15-2 and the second iron core 16-2, between the second iron core 16-2 and the first iron core 15-3, between the first iron core 15-3 and the second iron core 16-3, and between the second iron core 16-3 and the first iron core 15-1, wherein the iron cores are disposed in a substantially circumferential direction. The second iron core 16-1 is disposed such that respective second gap-facing surfaces 22 of the second iron core concerned 16-1 face against the first gap-facing surfaces 21 of the first iron core 15-1 adjacent to the second iron core concerned 16-1 and the first gap-facing surfaces 21 of the first iron core 15-2 adjacent to the second iron core concerned 16-1 with the gap 20 interposed therebetween. The second iron core 16-2 is also disposed such that respective second gap-facing surfaces 22 of the second iron core concerned 16-2 face against the first gap-facing surfaces 21 of the first iron core 15-2 adjacent to the second iron core concerned 16-2 and the first gap-facing surfaces 21 of the first iron core 15-3 adjacent to the second iron core concerned 16-2 with the gap 20 interposed therebetween. The second iron core 16-3 is also disposed such that respective second gap-facing surfaces 22 of the second iron core concerned 16-3 face against the first gap-facing surfaces 21 of the first iron core 15-1 adjacent to the second iron core concerned 16-3 and the first gap-facing surfaces 21 of the first iron core 15-3 adjacent to the second iron core concerned 16-3 with the gap 20 interposed therebetween. The windings 13 are wound on the second iron cores 16-1, 16-2, and 16-3. In the fourteenth embodiment of the present disclosure, either the first gap-facing surface 21 or the second gap-facing surface 22 has an area larger than the other. FIG. 21A and FIG. 21B illustrate, as an example, an embodiment in which the first gap-facing surface 21 has an area larger than the second gap-facing surface 22. The numbers of the first iron cores and the second iron cores are determined by the number of poles of the reactor 1. For example, when the number of poles is two, each of the numbers of the first iron cores and the second iron cores is two; when the number of poles is six, each of the numbers of the first iron cores and the second iron cores is six. In the illustrated example, the number of poles of the reactor 1 is configured to be 3; however, the number of poles does not inherently limit the present embodiment and may be any other value. Furthermore, the shapes of the first iron cores 15-1, 15-2, and 15-3 and the second iron cores 16-1, 16-2, and 16-3 illustrated in FIG. 21A and FIG. 21B are merely examples and may be any shape as long as the first gap-facing surfaces 21 and the second gap-facing surfaces 22 have shapes that satisfy the aforementioned relation.

Figure 22A:
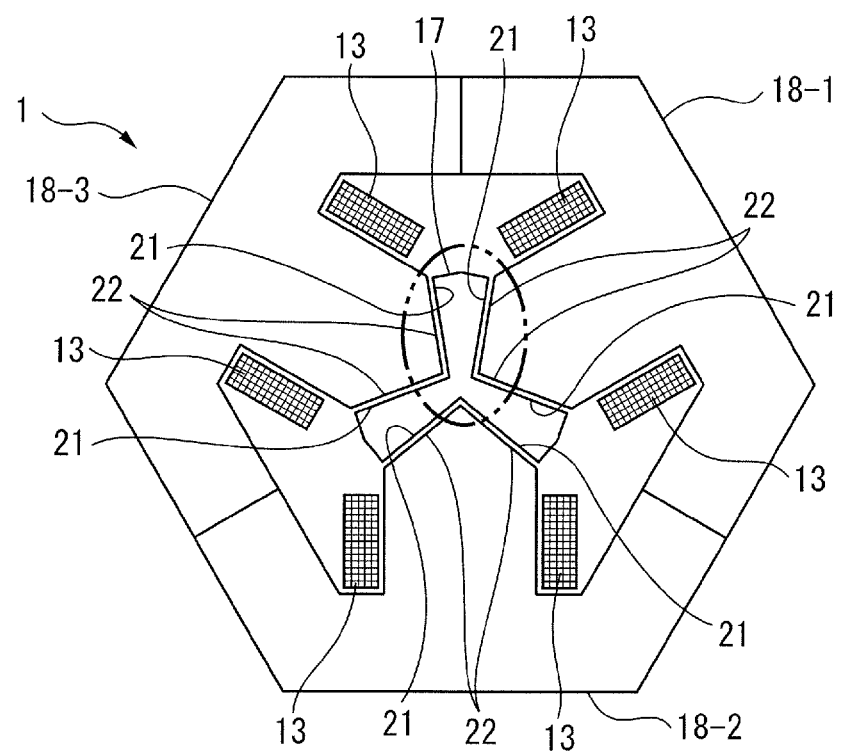
FIG. 22A is a full sectional view illustrating a reactor according to a fifteenth embodiment of the present disclosure.
Figure 22B:
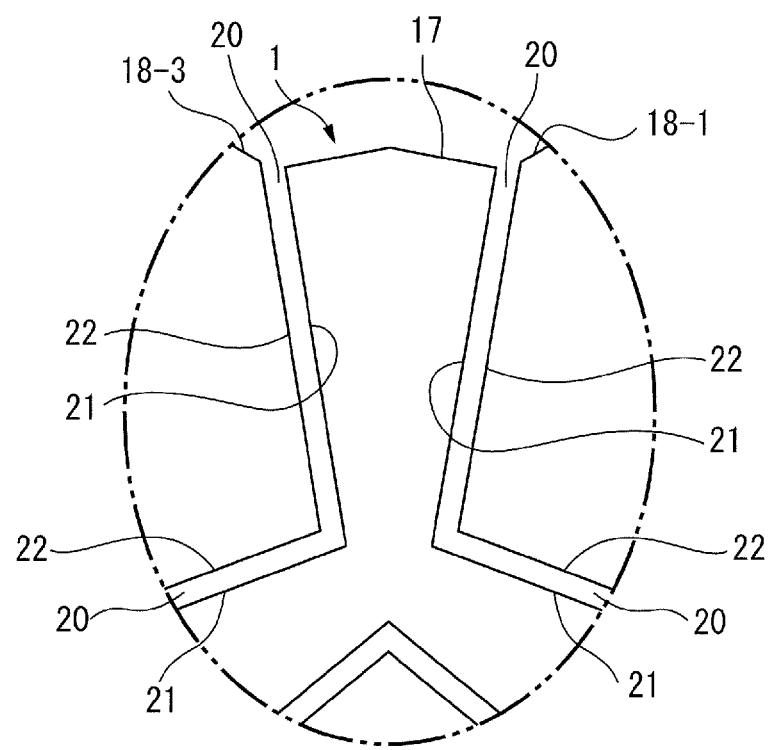
FIG. 22B is a view illustrating the reactor according to the fifteenth embodiment of the present disclosure, and an enlarged sectional view of a portion enclosed in the long dashed double-dotted line in FIG. 22A.

FIG. 22A is a full sectional view illustrating a reactor according to the fifteenth embodiment of the present disclosure. FIG. 22B is a view illustrating the reactor according to the fifteenth embodiment of the present disclosure, and an enlarged sectional view of a portion enclosed in the long dashed double-dotted line in FIG. 22A. The reactor 1 according to the fifteenth embodiment of the present disclosure is implemented as a prismatic three-phase reactor. According to the fifteenth embodiment of the present disclosure, the reactor 1 includes second iron cores 18-1, 18-2, and 18-3 each having two second gap-facing surfaces 22, a first iron core 17 having first gap-facing surfaces 21, the number of which correspond to the total number of the second gap-facing surfaces 22 of the second iron cores 18-1, 18-2, and 18-3 (six in an example illustrated in FIG. 22A and FIG. 22B), and windings 13. The second iron cores 18-1, 18-2, and 18-3 are disposed side by side with each other in a substantially circumferential direction such that each of the second gap-facing surfaces 22 of the second iron core concerned faces against any one of the first gap-facing surfaces 21 of the first iron core 17 with a gap 20 interposed therebetween. In other words, as illustrated in FIG. 22A and FIG. 22B, gaps 20 are formed between the second iron core 18-1 and the first iron core 17, between the second iron core 18-2 and the first iron core 17, and between the second iron core 18-3 and the first iron core 17, wherein the second iron cores are disposed in a substantially circumferential direction. The windings 13 are wound on the second iron cores 18-1, 18-2, and 18-3. In the fifteenth embodiment of the present disclosure, either the first gap-facing surface 21 or the second gap-facing surface 22 has an area larger than the other. FIG. 22A and FIG. 22B illustrate, as an example, an embodiment in which the first gap-facing surface 21 has an area larger than the second gap-facing surface 22. The number of the first gap-facing surfaces 21 of the first iron core and the number of the second iron cores are determined by the number of poles of the reactor 1. For example, when the number of poles is two, the number of the first gap-facing surfaces 21 of the first iron cores is four and the number of the second iron cores is two; when the number of poles is six, the number of the first gap-facing surfaces 21 of the first iron cores is twelve and the number of the second iron cores is six. In the illustrated example, the number of poles of the reactor 1 is configured to be 3; however, the number of poles does not inherently limit the present embodiment and may be any other value. Furthermore, the shapes of the first iron core 17 and the second iron cores 18-1, 18-2, and 18-3 illustrated in FIG. 22A and FIG. 22B are merely examples and may be any shape as long as the first gap-facing surfaces 21 and the second gap-facing surfaces 22 have shapes that satisfy the aforementioned relation.

In variation examples of the tenth to fifteenth embodiments described above, the iron cores disposed at the outer circumference may be in contact with each other at a region other than the first gap-facing surface 21 and the second gap-facing surface 22 or may be formed integrally, which will be described with reference to FIG. 23 to FIG. 28.

Figure 23:
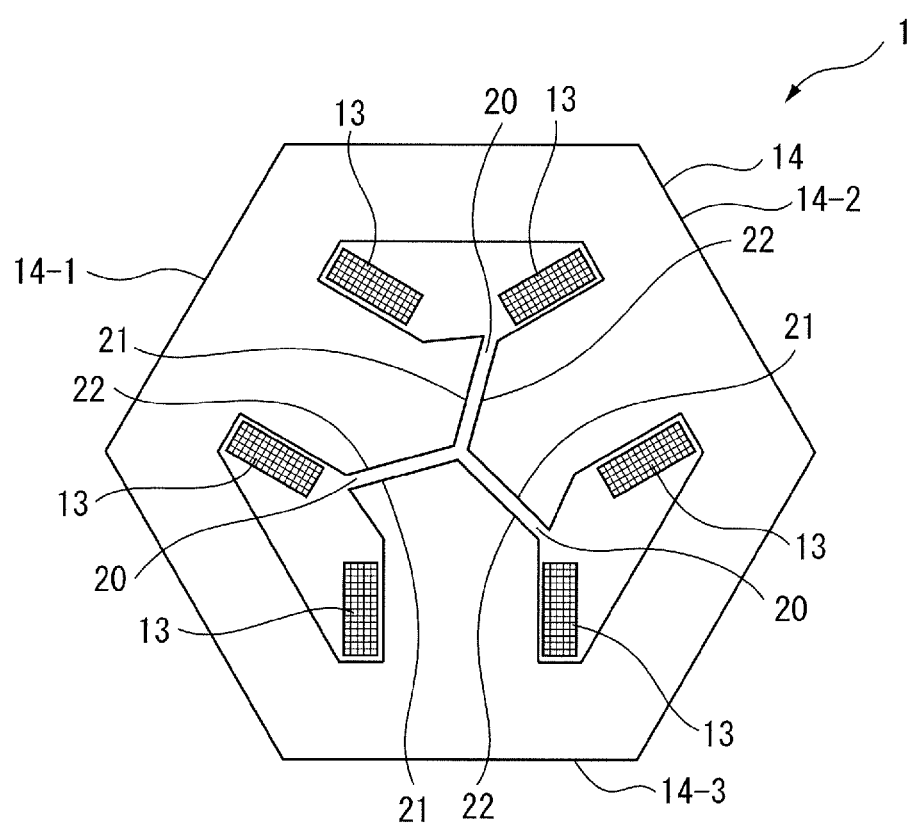
FIG. 23 is a full sectional view illustrating a variation example of the reactor according to the tenth embodiment of the present disclosure.

FIG. 23 is a full sectional view illustrating a variation example of the reactor according to the tenth embodiment of the present disclosure. In the present variation example, the iron cores 14-1, 14-2, and 14-3 of the reactor 1 of the tenth embodiment described with reference to FIG. 17A and FIG. 17B are configured to be in contact with each other at a region other than the first gap-facing surface 21 and the second gap-facing surface 22 or formed integrally to be an iron core 14. Since components other than these are similar to those illustrated in FIG. 17A and FIG. 17B, the same reference numerals denote the same components, and detailed description thereof is omitted.

Figure 24:
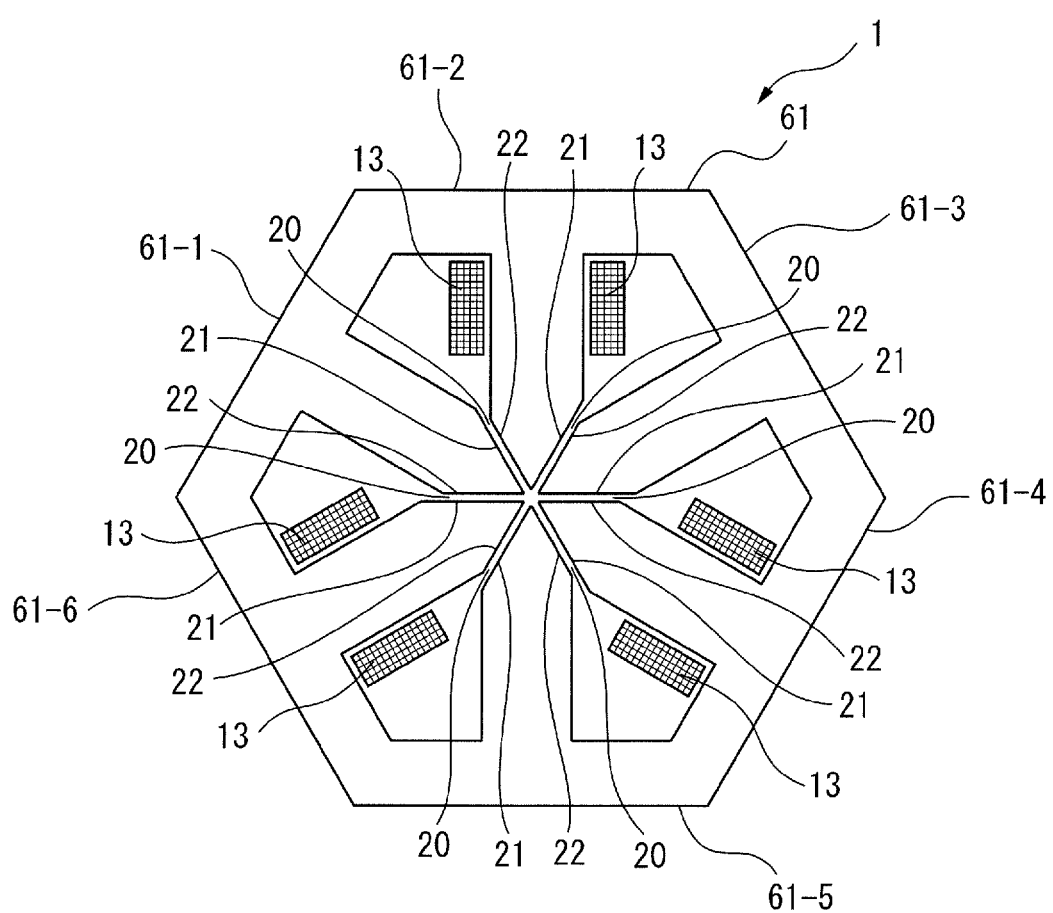
FIG. 24 is a full sectional view illustrating a variation example of the reactor according to the eleventh embodiment of the present disclosure.

FIG. 24 is a full sectional view illustrating a variation example of the reactor according to the eleventh embodiment of the present disclosure. In the present variation example, the iron cores 61-1, 61-2, 61-3, 61-4, 61-5, and 61-6 of the reactor 1 of the eleventh embodiment described with reference to FIG. 18 are configured to be in contact with each other at a region other than the first gap-facing surface 21 and the second gap-facing surface 22 or formed integrally to be an iron core 61. Since components other than these are similar to those illustrated in FIG. 18, the same reference numerals denote the same components, and detailed description thereof is omitted.

Figure 25A:
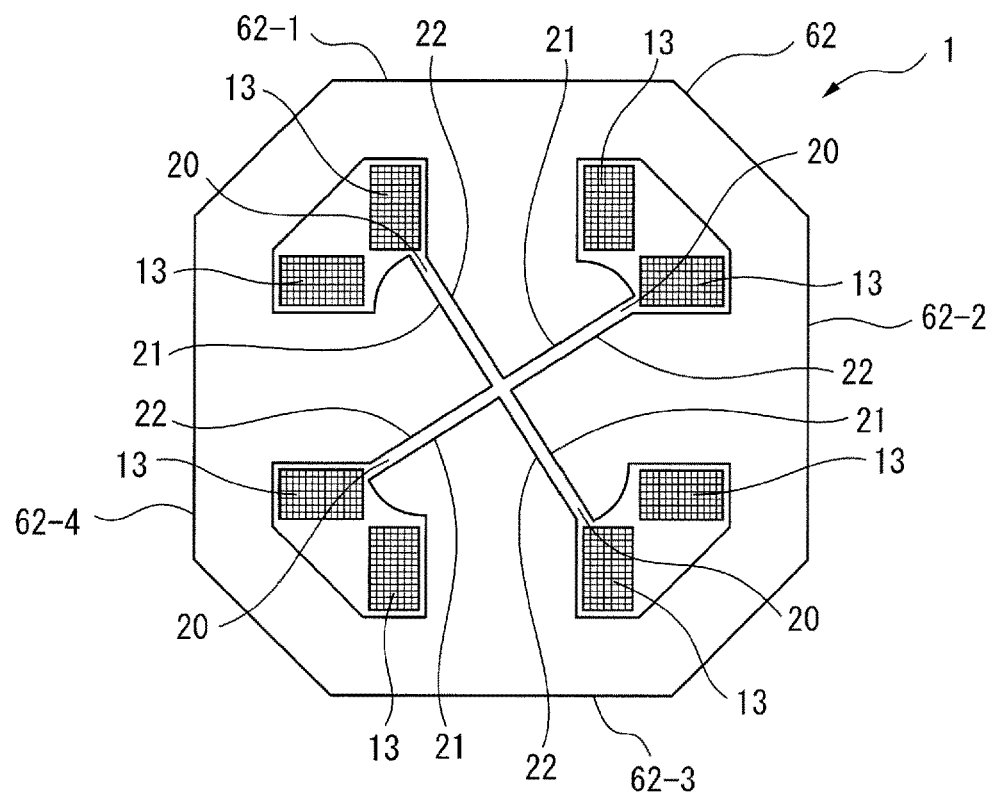
FIG. 25A is a full sectional view illustrating a variation example of the reactor according to the twelfth embodiment of the present disclosure, and illustrates an example in which a winding is wound on all iron cores.
Figure 25B:
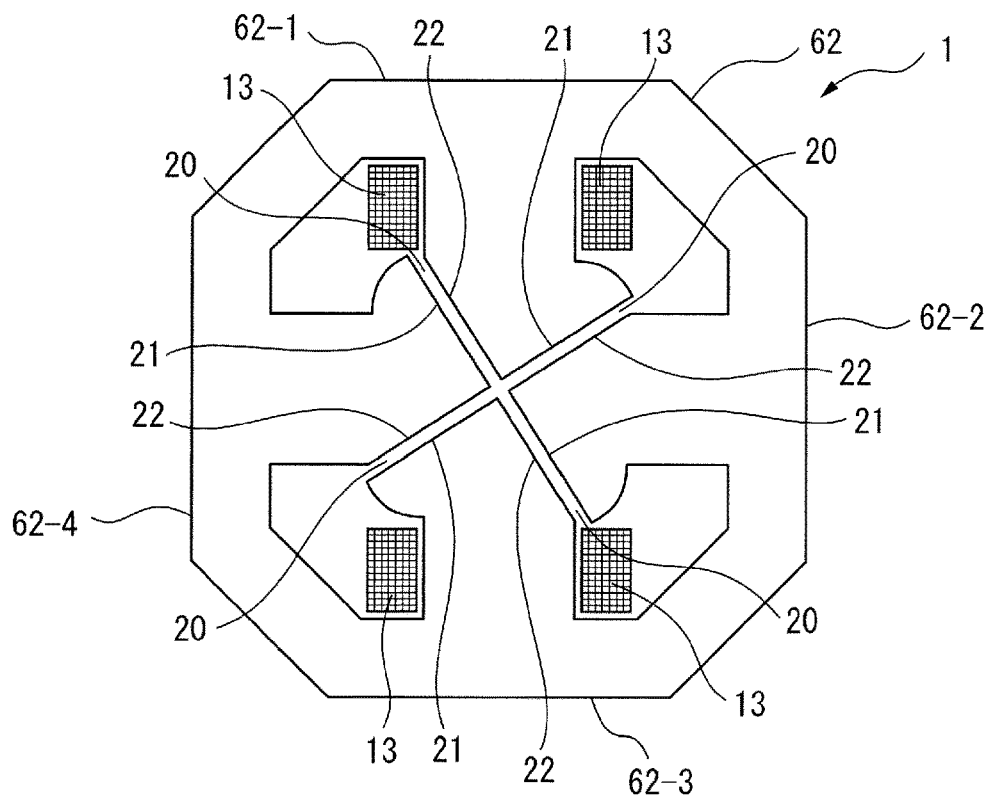
FIG. 25B is a full sectional view illustrating a variation example of the reactor according to the twelfth embodiment of the present disclosure, and illustrates an example in which a winding is wound on some of the iron cores.

FIG. 25A is a full sectional view illustrating a variation example of the reactor according to the twelfth embodiment of the present disclosure, and illustrates an example in which a winding is wound on all iron cores. FIG. 25B is a full sectional view illustrating a variation example of the reactor according to the twelfth embodiment of the present disclosure, and illustrates an example in which a winding is wound on some of the iron cores. In the present variation examples, the iron cores 62-1, 62-2, 62-3, and 62-4 of the reactor 1 of the twelfth embodiment described with reference to FIG. 19A and FIG. 19B are configured to be in contact with each other at a region other than the first gap-facing surface 21 and the second gap-facing surface 22 or formed integrally to be an iron core 62. Since components other than these are similar to those illustrated in FIG. 19A and FIG. 19B, the same reference numerals denote the same components, and detailed description thereof is omitted.

Figure 26A:
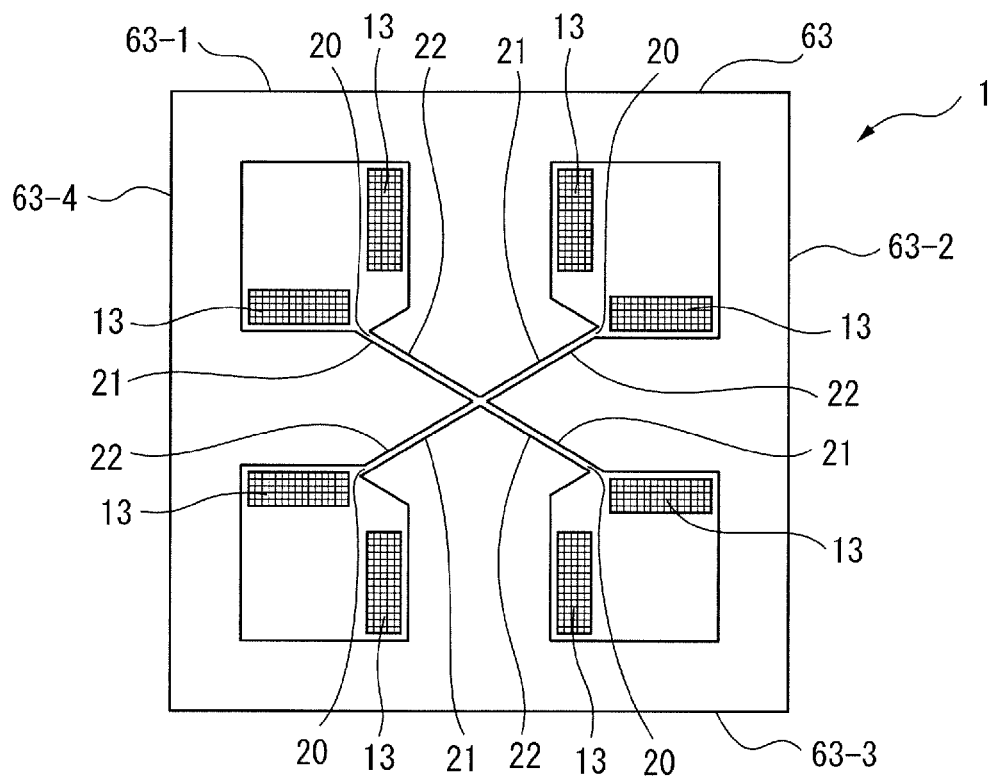
FIG. 26A is a full sectional view illustrating a variation example of the reactor according to the thirteenth embodiment of the present disclosure, and illustrates an example in which a winding is wound on all iron cores.
Figure 26B:
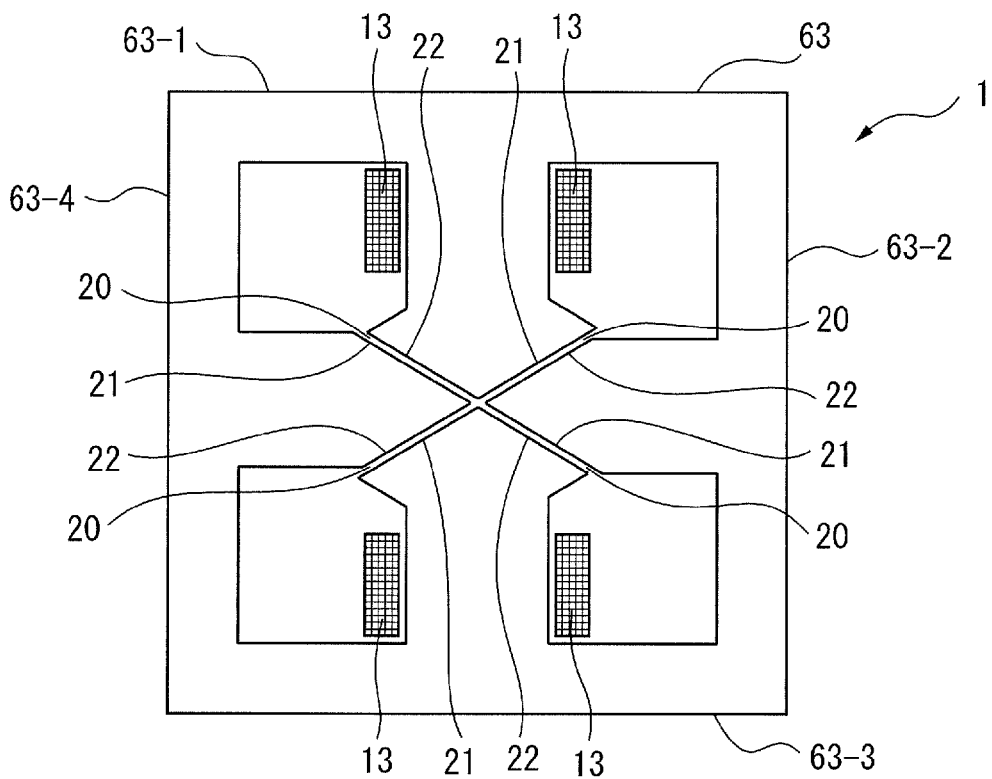
FIG. 26B is a full sectional view illustrating a variation example of the reactor according to the thirteenth embodiment of the present disclosure, and illustrates an example in which a winding is wound on some of the iron cores.

FIG. 26A is a full sectional view illustrating a variation example of the reactor according to the thirteenth embodiment of the present disclosure, and illustrates an example in which a winding is wound on all iron cores. FIG. 26B is a full sectional view illustrating a variation example of the reactor according to the thirteenth embodiment of the present disclosure, and illustrates an example in which a winding is wound on some of the iron cores. In the present variation examples, the iron cores 63-1, 63-2, 63-3, and 63-4 of the reactor 1 of the thirteenth embodiment described with reference to FIG. 20A and FIG. 20B are configured to be in contact with each other at a region other than the first gap-facing surface 21 and the second gap-facing surface 22 or formed integrally to be an iron core 63. Since components other than these are similar to those illustrated in FIG. 20A and FIG. 20B, the same reference numerals denote the same components, and detailed description thereof is omitted.

Figure 27:
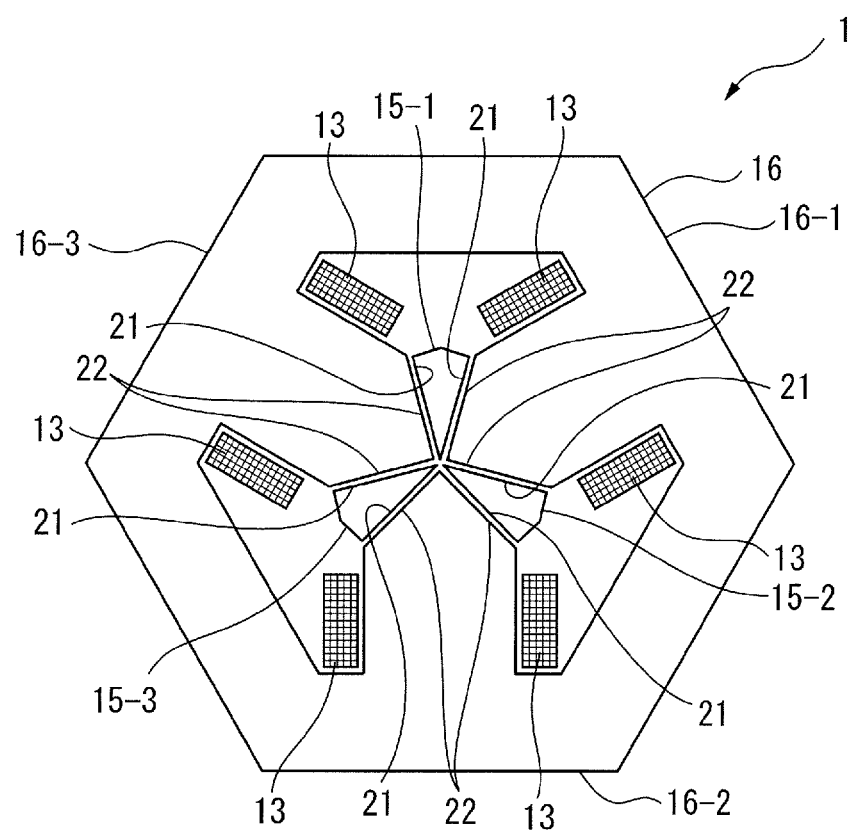
FIG. 27 is a full sectional view illustrating a variation example of the reactor according to the fourteenth embodiment of the present disclosure.

FIG. 27 is a full sectional view illustrating a variation example of the reactor according to the fourteenth embodiment of the present disclosure. In the present variation example, the second iron cores 16-1, 16-2, and 16-3 of the reactor 1 of the fourteenth embodiment described with reference to FIG. 21A and FIG. 21B are configured to be in contact with each other at a region other than the first gap-facing surface 21 and the second gap-facing surface 22 or formed integrally to be an iron core 16. Since components other than these are similar to those illustrated in FIG. 21A and FIG. 21B, the same reference numerals denote the same components, and detailed description thereof is omitted.

Figure 28:
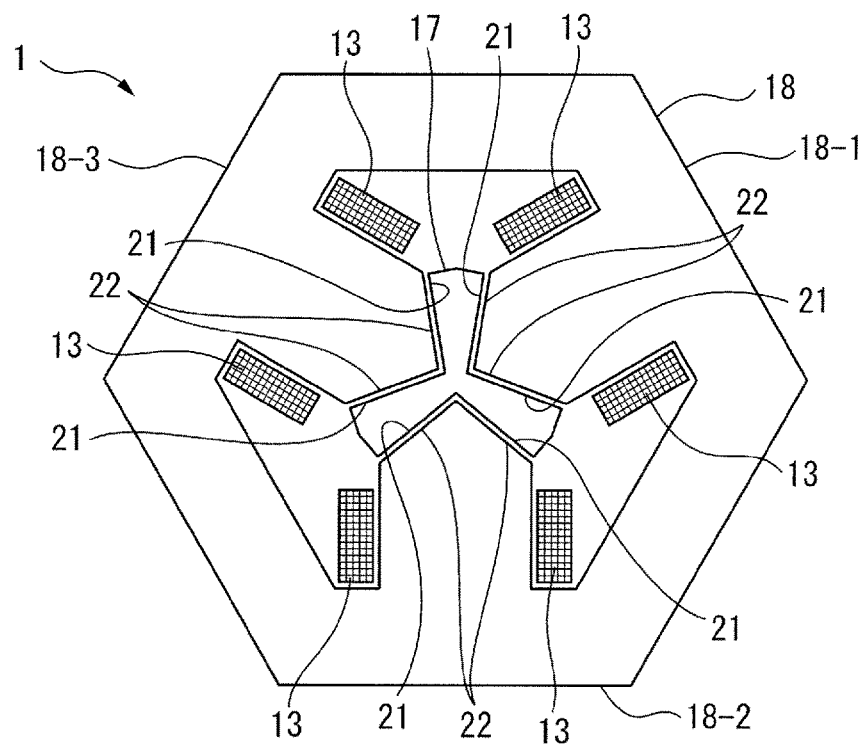
FIG. 28 is a full sectional view illustrating a variation example of the reactor according to the fifteenth embodiment of the present disclosure.

FIG. 28 is a full sectional view illustrating a variation example of the reactor according to the fifteenth embodiment of the present disclosure. In the present variation example, the second iron cores 18-1, 18-2, and 18-3 of the reactor 1 of the fifteenth embodiment described with reference to FIG. 22A and FIG. 22B are configured to be in contact with each other at a region other than the first gap-facing surface 21 and the second gap-facing surface 22 or formed integrally to be an iron core 18. Since components other than these are similar to those illustrated in FIG. 22A and FIG. 22B, the same reference numerals denote the same components, and detailed description thereof is omitted.

The reactor 1 according to each of the above-described embodiments of the present disclosure may be used in a motor drive apparatus as at least one of an AC reactor on an AC input side of a rectifier for converting AC power supplied from an AC power supply into DC power, a smoothing reactor on a DC output side of the rectifier, and a reactor constituting an LC filter on an AC output side of an inverter for converting DC power output by the rectifier into AC power for driving a motor. This will be described more specifically with reference to FIG. 29.

Figure 29:
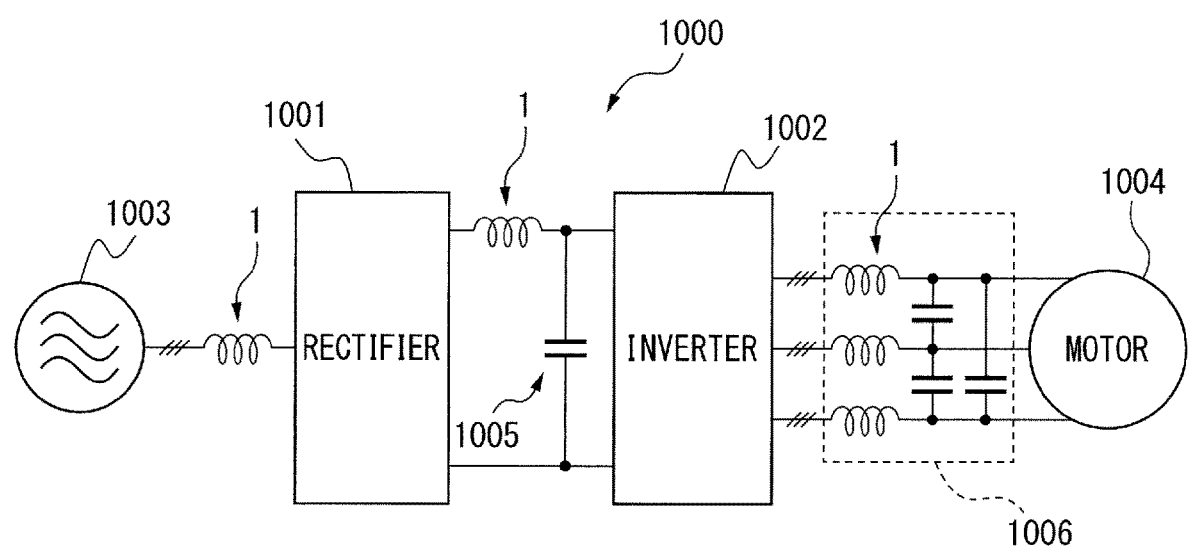
FIG. 29 is a diagram illustrating a motor drive apparatus including a reactor according to one aspect of the present disclosure.

FIG. 29 is a diagram illustrating a motor drive apparatus including a reactor according to one aspect of the present disclosure. The motor drive apparatus 1000 includes a rectifier 1001, which converts AC power supplied from an AC power supply 1003 side into DC power, which is output to a DC link in which a DC capacitor 1005 is provided, an inverter 1002, which converts the DC power output by the rectifier 1001 into AC power for driving a motor, and the motor drive apparatus 1000 controls velocity, torque, or a position of a motor 1004 connected to an AC output side of the inverter 1002. The rectifier 1001 includes a reactor 1 according to one aspect of the present disclosure on an AC input side as an AC reactor, and includes the reactor 1 according to one aspect of the present disclosure on a DC output side as a smoothing reactor. The inverter 1002 includes the reactor 1 according to one aspect of the present disclosure on an AC output side as a reactor constituting an LC filter 1006 on the AC output side. In the illustrated example, the reactor 1 according to one aspect of the present disclosure is used for three types of reactors, i.e., the AC reactor provided on the AC input side of the rectifier 1001, the smoothing reactor on the DC output side of the rectifier 1001, and the reactor constituting the LC filter 1006 on the AC output side of the inverter 1002; however, the reactor 1 according to one aspect of the present disclosure may not be necessarily used for all of these three types of reactors, and may be used for only one or two of these three types of reactors.

According to one aspect of the present disclosure, a reactor that can suppress generation of leakage flux near a gap, store more magnetic energy, and reduce eddy-current loss as well as a rectifier, an LC filter, and a motor drive apparatus including such reactor can be realized.

According to one aspect of the present disclosure, by configuring a reactor including a plurality of iron cores and a winding wound on any of the plurality of iron cores such that a gap-facing surface of one of the iron cores has an area larger than that of a gap-facing surface of the other iron core in the iron cores disposed side by side with each other, such reactor can suppress generation of leakage flux near a gap, store more magnetic energy, and reduce eddy-current loss.

The invention claimed is:

1. A reactor comprising:
a plurality of iron cores; and
a winding wound on any of the plurality of iron cores;
wherein a gap is formed between two of the iron cores facing against each other and a gap-facing surface of one of the iron cores has an area larger than that of a gap-facing surface of the other iron core,
wherein the plurality of iron cores comprise a plurality of second iron cores each having two second gap-facing surfaces and a first iron core having first gap-facing surfaces, the number of which correspond to the total number of the second gap-facing surfaces of the plurality of second iron cores,
wherein the second iron cores are disposed side by side with each other in a substantially circumferential direction such that each of the second gap-facing surfaces of the second iron core concerned faces against one of the first gap-facing surfaces of the first iron core,
wherein the winding is wound on the second iron core, and
wherein either the first gap-facing surface or the second gap-facing surface has an area larger than the other.

2. The reactor according to claim 1,
wherein the plurality of iron cores comprise a first iron core having a first gap-facing surface and a second iron core having a second gap-facing surface as a surface facing against the first gap-facing surface,
wherein the winding is wound on one of the first iron core and the second iron core or both thereof,
wherein a portion of the first gap-facing surface near an outer edge thereof of the first iron core and an axial direction form an acute angle on an inner side of the first iron core,
wherein a portion of the second gap-facing surface near an outer edge thereof of the second iron core and an axial direction form an obtuse angle on an inner side of the second iron core, and
wherein the first gap-facing surface is configured to have a larger area than the second gap-facing surface.

3. The reactor according to claim 1, wherein the respective iron cores are configured to be in contact with each other at a region other than the gap-facing surfaces or formed integrally.

4. The reactor according to claim 3,
wherein the plurality of iron cores comprise a first iron core having a first gap-facing surface and a second iron core having a second gap-facing surface as a surface facing against the first gap-facing surface,
wherein the winding is wound on one of the first iron core and the second iron core or both thereof,
wherein a portion of the first gap-facing surface near an outer edge thereof of the first iron core and an axial direction form an acute angle on an inner side of the first iron core,
wherein a portion of the second gap-facing surface near an outer edge thereof of the second iron core and an axial direction form an obtuse angle on an inner side of the second iron core, and
wherein the first gap-facing surface is configured to have a larger area than the second gap-facing surface.

* * * * *